(12) United States Patent
Wakimoto et al.

(10) Patent No.: US 10,665,829 B2
(45) Date of Patent: May 26, 2020

(54) RECTANGULAR SECONDARY BATTERY AND METHOD OF MANUFACTURING THE SAME

(71) Applicant: SANYO Electric Co., Ltd., Daito-shi, Osaka (JP)

(72) Inventors: Ryoichi Wakimoto, Hyogo (JP); Hiroshi Takabayashi, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 161 days.

(21) Appl. No.: 16/008,197

(22) Filed: Jun. 14, 2018

(65) Prior Publication Data

US 2018/0375070 A1  Dec. 27, 2018

(30) Foreign Application Priority Data

Jun. 23, 2017  (JP) .................. 2017-123212

(51) Int. Cl.
| | |
|---|---|
| H01M 4/02 | (2006.01) |
| H01M 2/08 | (2006.01) |
| H01M 10/28 | (2006.01) |
| H01M 4/525 | (2010.01) |
| H01M 4/505 | (2010.01) |

(Continued)

(52) U.S. Cl.
CPC .......... *H01M 2/08* (2013.01); *H01M 2/0473* (2013.01); *H01M 2/26* (2013.01); *H01M 2/263* (2013.01); *H01M 2/30* (2013.01); *H01M 2/345* (2013.01); *H01M 4/1391* (2013.01); *H01M 4/505* (2013.01); *H01M 4/525* (2013.01); *H01M 4/583* (2013.01); *H01M 4/661* (2013.01); *H01M 10/28* (2013.01); *H01M 10/0525* (2013.01); *H01M 2004/027* (2013.01); *H01M 2004/028* (2013.01); *H01M 2200/103* (2013.01); *H01M 2200/20* (2013.01)

(58) Field of Classification Search
CPC ....................................................... H01M 4/02
See application file for complete search history.

(56) References Cited

U.S. PATENT DOCUMENTS

| | | |
|---|---|---|
| 2009/0004561 A1 | 1/2009 | Nansaka et al. |
| 2009/0239133 A1 | 9/2009 | Kosugi |

(Continued)

FOREIGN PATENT DOCUMENTS

| | | |
|---|---|---|
| JP | 2008-226625 A | 9/2008 |
| JP | 2009-32640 A | 2/2009 |

*Primary Examiner* — Jacob B Marks
(74) *Attorney, Agent, or Firm* — Westerman, Hattori, Daniels & Adrian, LLP

(57) ABSTRACT

An electrode body is disposed in a rectangular casing having an opening, and the opening of the rectangular casing is sealed by a sealing plate. A positive-electrode current collector is connected to a positive electrode terminal that extends through the sealing plate. A first positive-electrode tab group and the second positive-electrode tab group, which are connected to the electrode body, is connected to a surface of the positive-electrode current collector facing the electrode body. The first positive-electrode tab group and the second positive-electrode tab group are each disposed at an end portion of the electrode body adjacent to the sealing plate, and the first positive-electrode tab group and the second positive-electrode tab group are disposed so as to be bent in different directions.

15 Claims, 15 Drawing Sheets

(51) Int. Cl.
*H01M 4/583* (2010.01)
*H01M 4/1391* (2010.01)
*H01M 2/26* (2006.01)
*H01M 4/66* (2006.01)
*H01M 2/30* (2006.01)
*H01M 2/34* (2006.01)
*H01M 2/04* (2006.01)
*H01M 10/0525* (2010.01)

(56) References Cited

U.S. PATENT DOCUMENTS

| | | |
|---|---|---|
| 2015/0364727 A1 | 12/2015 | Kim |
| 2016/0099457 A1 | 4/2016 | Park et al. |
| 2016/0336545 A1* | 11/2016 | Wakimoto ............ H01M 2/345 |

* cited by examiner

RECTANGULAR SECONDARY BATTERY AND METHOD OF MANUFACTURING THE SAME

CROSS REFERENCE TO RELATED APPLICATIONS

The present invention application claims priority to Japanese Patent Application No. 2017-123212 filed in the Japan Patent Office on Jun. 23, 2017, the entire contents of which are incorporated herein by reference.

BACKGROUND OF THE INVENTION

Field of the Invention

The present invention relates to a rectangular secondary battery and a method of manufacturing a rectangular secondary battery.

Description of Related Art

Rectangular secondary batteries, such as alkaline secondary batteries and non-aqueous electrolyte secondary batteries, are used as driving electric power sources of electric vehicles (EV), hybrid electric vehicles (HEV, PHEV), and the like.

The rectangular secondary batteries each have a battery case that is composed of a rectangular casing, which has an opening and a bottomed-rectangular-tubular shape, and a sealing plate that seals the opening. The battery case contains an electrode body together with an electrolyte. The electrode body is composed of a positive electrode plate, a negative electrode plate, and a separator. A positive electrode terminal and a negative electrode terminal are attached to the sealing plate. The positive electrode terminal is electrically connected to the positive electrode plate via a positive-electrode current collector, and the negative electrode terminal is electrically connected to the negative electrode plate via a negative-electrode current collector.

The positive electrode plate includes a positive electrode core, which is made of a metal, and a positive-electrode-active-material mixture layer, which is formed on a surface of the positive electrode core. The positive electrode core has a positive-electrode-core exposed portion, on which the positive-electrode-active-material mixture layer is not formed. A positive-electrode current collector is connected to the positive-electrode-core exposed portion. The negative electrode plate includes a negative electrode core, which is made of a metal, and a negative-electrode-active-material mixture layer, which is formed on a surface of the negative electrode core. The negative electrode core has a negative-electrode-core exposed portion, on which the negative-electrode-active-material mixture layer is not formed. A negative-electrode current collector is connected to the negative-electrode-core exposed portion.

For example, Japanese Published Unexamined Patent Application No. 2009-032640 (Patent Document 1) describes a rectangular secondary battery including a rolled electrode body having a rolled positive-electrode-core exposed portion at one end thereof and a rolled negative-electrode-core exposed portion at the other end thereof.

Japanese Published Unexamined Patent Application No. 2008-226625 (Patent Document 2) describes a rectangular secondary battery including an electrode body having a positive-electrode-core exposed portion and a negative-electrode-core exposed portions at one end thereof.

Regarding secondary batteries used for vehicles, in particular, EVs and PHEVs, it is desirable to develop a secondary battery having higher volumetric energy density and larger battery capacity. In the rectangular secondary battery described in Patent Document 1, the inside of the battery case needs to have left and right spaces, for disposing the rolled positive-electrode-core exposed portion and the rolled negative-electrode-core exposed portion, and an upper space between the sealing plate and the rolled electrode body. For this reason, it is difficult to increase the volumetric energy density of the secondary battery.

In contrast, as in the rectangular secondary battery described in Patent Document 2, by using an electrode body having a positive-electrode-core exposed portion and a negative-electrode-core exposed portion at one end thereof, the inside of the battery case need not have left and right spaces for disposing the positive-electrode-core exposed portion and the negative-electrode-core exposed portion.

BRIEF SUMMARY OF THE INVENTION

An object of the present invention is to provide a rectangular secondary battery having higher volumetric energy density and a method of manufacturing the rectangular secondary battery.

A rectangular secondary battery according to an aspect of the present invention includes a rectangular casing that has an opening, a sealing plate that seals the opening, an electrode body that is disposed in the rectangular casing and that includes a positive electrode plate and a negative electrode plate, a tab that is connected to the positive electrode plate or the negative electrode plate, a current collector that is connected to the tab, and a terminal that is electrically connected to the current collector and that extends through the sealing plate. The electrode body includes a first tab group that is composed of a plurality of the tabs and a second tab group that is composed of a plurality of the tabs. The first tab group and the second tab group are disposed between the electrode body and the sealing plate. The first tab group and the second tab group are disposed so as to be bent in different directions. The first tab group and the second tab group are each connected to a surface of the current collector facing the electrode body.

In the rectangular secondary battery according to the aspect of the present invention, the first tab group and the second tab group are disposed between the electrode body and the sealing plate, the first tab group and the second tab group are bent in different directions, and the first tab group and second tab group are connected to a surface of the current collector facing the electrode body. This structure allows a space between the sealing plate and the electrode body to be reduced. Thus, the proportion of a space in the battery case occupied by the electrode body can be increased. Accordingly, the rectangular secondary battery can have higher volumetric energy density.

Preferably, the rectangular secondary battery further includes an outer conductor that is disposed further outward from the sealing plate with respect to the battery, the terminal includes a flange portion at a position nearer than the sealing plate to the electrode body, the terminal is upset on the outer conductor at a position further outward from the sealing plate with respect to the battery, and the current collector is connected to a surface of the flange portion facing the electrode body. In this case, because the terminal is upset at a position further outward from the sealing plate with respect to the battery, a burr or the like, which may be generated at the upset portion of the terminal, is reliably prevented from entering the inside of the electrode body and short-circuiting the positive electrode plate and the negative electrode plate. Moreover, the current collector can be more stably connected to the terminal than in a case where the current collector is connected to the upset portion of the terminal.

Preferably, the rectangular secondary battery further includes a short-circuit mechanism that operates when a pressure inside a battery case, which is composed of the rectangular casing and the sealing plate, becomes a predetermined pressure or higher, and that short-circuits the positive electrode plate and the negative electrode plate at a position outside of the electrode body. This structure can improve the reliability of the rectangular secondary battery when the battery is overcharged.

Preferably, the electrode body includes a first electrode body element and a second electrode body element, the first tab group is connected to the first electrode body element, and the second tab group is connected to the second electrode body element. Preferably, the first electrode body element and the second electrode body element are each a rolled electrode body element, and the first electrode body element and the second electrode body element are each disposed in the rectangular casing in an orientation such that a roll axis thereof is perpendicular to the sealing plate. Preferably, the tab is a negative electrode tab that is connected to the negative electrode plate, and, in the first electrode body element, the number of the negative electrode tabs is less than the number of layers of the negative electrode plate that are stacked.

Preferably, the electrode body further includes a third electrode body element that is a rolled electrode body element including a third tab group and a fourth electrode body element that is a rolled electrode body element including a fourth tab group; and the third tab group is superposed on the first tab group and connected to the current collector, and the fourth tab group is superposed on the second tab group and connected to the current collector. In this case, the rectangular secondary battery can have higher volumetric energy density.

Preferably, the current collector is a positive-electrode current collector that is connected to the positive electrode plate and that is made of aluminum or an aluminum alloy, and a fuse portion is formed in the positive-electrode current collector. In a case where the first positive-electrode tab group and the second positive-electrode tab group are provided, preferably, a first fuse portion is formed between a part of the positive-electrode current collector connected to the positive electrode terminal and a part of the positive-electrode current collector connected to the first positive-electrode tab group, and a second fuse portion is formed between a part of the positive-electrode current collector connected to the positive electrode terminal and a part of the positive-electrode current collector connected to the second positive-electrode tab group.

A method of manufacturing a rectangular secondary battery according to an aspect of the present invention is a method of manufacturing a rectangular secondary battery including a rectangular casing that has an opening, a sealing plate that seals the opening, an electrode body that is disposed in the rectangular casing and that includes a positive electrode plate and a negative electrode plate, a tab that is connected to the positive electrode plate or the negative electrode plate, a current collector that is connected to the tab, and a terminal that is electrically connected to the current collector and that extends through the sealing plate. The electrode body includes a first tab group that is composed of a plurality of the tabs and a second tab group that is composed of a plurality of the tabs, the first tab group and the second tab group are disposed between the electrode body and the sealing plate, the first tab group and the second tab group are disposed so as to be bent in different directions, the first tab group and the second tab group are each connected to a surface of the current collector facing the electrode body, and the electrode body includes a first electrode body element and a second electrode body element. The method includes a first connection step of connecting, to one surface of the current collector, the first tab group that is connected to the first electrode body element and the second tab group that is connected to the second electrode body element; and an electrode-body producing step of combining the first electrode body element and the second electrode body element together in such a way that the first tab group and the second tab group are bent in different directions.

By using the method according to the aspect of the present invention, a rectangular secondary battery having high volumetric energy density can be easily manufactured with a simpler method.

Preferably, the rectangular secondary battery further includes an outer conductor that is disposed further outward from the sealing plate with respect to the battery, and the terminal includes a flange portion at a position nearer than the sealing plate to the electrode body; and the method further includes an upsetting step of upsetting an end portion of the terminal on the outer conductor; and a second connection step of connecting, after the upsetting step and the first connection step, the current collector to a surface of the flange portion facing the electrode body.

Preferably, the rectangular secondary battery further includes a short-circuit mechanism that operates when a pressure inside a battery case, which is composed of the rectangular casing and the sealing plate, becomes a predetermined pressure or higher, and that short-circuits the positive electrode plate and the negative electrode plate at a position outside of the electrode body.

Preferably, the method further includes a step of producing the first electrode body element by rolling up the positive electrode plate having a strip-like shape and the negative electrode plate having a strip-like shape with a separator having a strip-like shape therebetween, and a step of producing the second electrode body element by rolling up the positive electrode plate having a strip-like shape and the negative electrode plate having a strip-like shape with a separator having a strip-like shape therebetween. Preferably, the tab is a negative electrode tab that is connected to the negative electrode plate; and, in the step of producing the first electrode body element, the first electrode body element is produced, by using the negative electrode plate provided with a plurality of the negative electrode tabs, in such a way that the number of the negative electrode tabs is less than the number of layers of the negative electrode plate that are stacked.

Preferably, the electrode body further includes a third electrode body element that is a rolled electrode body element including a third tab group and a fourth electrode body element that is a rolled electrode body element including a fourth tab group; and, in the first connection step, the first tab group and the third tab group are superposed on each other and connected to the current collector in a state in which the first electrode body element and the third electrode body element are superposed on each other, and the second tab group and the fourth tab group are superposed on each other and connected to the current collector in a state in which the second electrode body element and the fourth electrode body element are superposed on each other.

Preferably, the current collector is a positive-electrode current collector; in the positive-electrode current collector, a first fuse portion is formed between a portion connected to the terminal and a portion connected to the first tab group; and, in the positive-electrode current collector, a second fuse portion is formed between a portion connected to the terminal and a portion connected to the second tab group.

The present invention can provide a rectangular secondary battery having higher volumetric energy density.

DETAILED DESCRIPTION OF THE INVENTION

Hereinafter, the structure of a rectangular secondary battery 20 according to an embodiment will be described. Note that the present invention is not limited to the embodiment described below.

Figure 1:
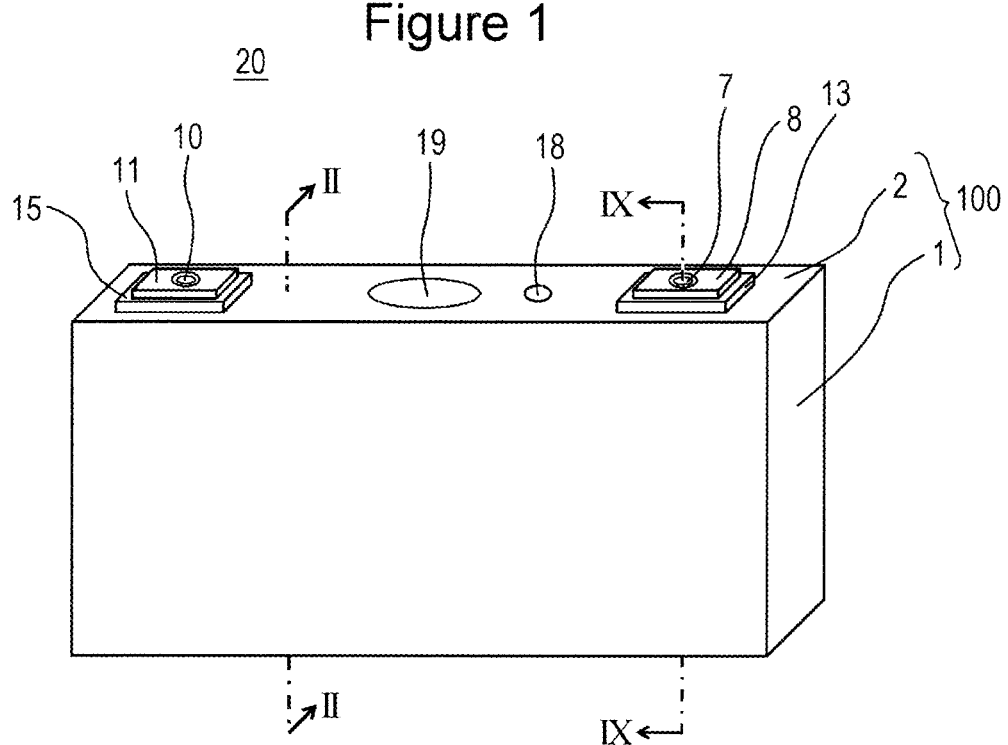
FIG. 1 is a perspective view of a rectangular secondary battery according to an embodiment.
Figure 2:
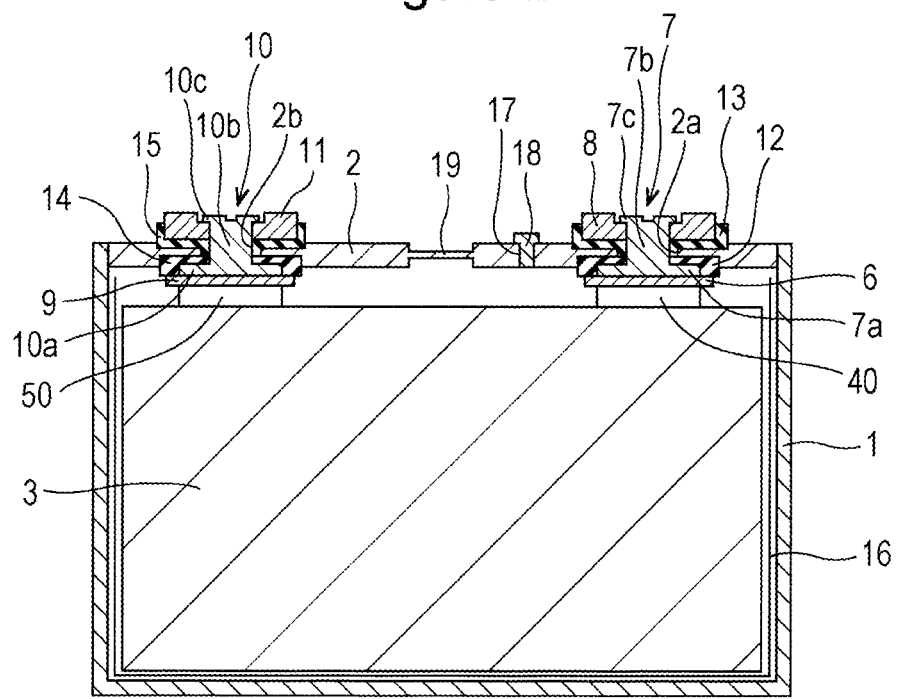
FIG. 2 is a sectional view taken along line II-II of FIG. 1.

As illustrated in FIGS. 1 and 2, the rectangular secondary battery 20 includes a battery case 100 that is composed of a rectangular casing 1, which has an opening and a bottomed-rectangular-tubular shape, and a sealing plate 2 that seals the opening of the rectangular casing 1. Preferably, the rectangular casing 1 and the sealing plate 2 are each made of a metal, such as aluminum or an aluminum alloy. The rectangular casing 1 contains an electrode body 3 together with an electrolyte. The electrode body 3 includes a positive electrode plate having a positive electrode tab and a negative electrode plate having a negative electrode tab. An insulating sheet 16, which is made of a resin, is disposed between the electrode body 3 and the rectangular casing 1.

A positive-electrode tab group 40, which is composed of a plurality of positive electrode tabs, and a negative-electrode tab group 50, which is composed of a plurality of negative electrode tabs, are disposed at an end of the electrode body 3 adjacent to the sealing plate 2. The positive-electrode tab group 40 includes a first positive-electrode tab group and a second positive-electrode tab group. The negative-electrode tab group 50 includes a first negative-electrode tab group and a second negative-electrode tab group. The positive-electrode tab group 40 is electrically connected to a positive electrode terminal 7 via a positive-electrode current collector 6. The positive electrode terminal 7 extends through the sealing plate 2 and is connected to a positive-electrode outer conductor 8, which is disposed on the outer side of the sealing plate 2. The negative-electrode tab group 50 is electrically connected to a negative electrode terminal 10 via a negative-electrode current collector 9. The negative electrode terminal 10 extends through the sealing plate 2 and is connected to a negative-electrode outer conductor 11, which is disposed on the outer side of the sealing plate 2.

An inner insulator 12, which is made of a resin, is disposed between the sealing plate 2 and the positive electrode terminal 7. An outer insulator 13, which is made of a resin, is disposed between the sealing plate 2 and the positive-electrode outer conductor 8. An inner insulator 14, which is made of a resin, is disposed between the sealing plate 2 and the negative electrode terminal 10. An outer insulator 15, which is made of a resin, is disposed between the sealing plate 2 and the negative-electrode outer conductor 11.

The positive electrode terminal 7 includes a flange portion 7a and an insertion portion 7b. The insertion portion 7b of the positive electrode terminal 7 is inserted, from the inside of the battery, into a through-hole in the inner insulator 12, a positive-electrode-terminal attachment hole 2a in the sealing plate 2, a through-hole in the outer insulator 13, and a through-hole in the positive-electrode outer conductor 8. Then, an upset portion 7c is formed by upsetting an end portion of the insertion portion 7b.

The negative electrode terminal 10 includes a flange portion 10a and an insertion portion 10b. The insertion portion 10b of the negative electrode terminal 10 is inserted, from the inside of the battery, into a through-hole in the inner insulator 14, a negative-electrode-terminal attachment hole 2b in the sealing plate 2, a through-hole in the outer insulator 15, and a through-hole in the negative-electrode outer conductor 11. Then, an upset portion 10c is formed by upsetting an end portion of the insertion portion 10b.

The positive-electrode current collector 6, the positive electrode terminal 7, and the positive-electrode outer conductor 8 are each made of, preferably, a metal, and, more preferably, aluminum or an aluminum alloy.

Preferably, the negative-electrode current collector 9, the negative electrode terminal 10, and the negative-electrode outer conductor 11 are each made of a metal. Preferably, the negative-electrode current collector 9 is made of copper or a copper alloy. A nickel layer may be formed on a surface of the negative-electrode current collector 9. Preferably, the negative electrode terminal 10 is made of copper, a copper alloy, aluminum, or an aluminum alloy. A nickel layer may be formed on a surface of the negative electrode terminal 10. Preferably, the negative-electrode outer conductor 11 is made of copper, a copper alloy, aluminum, or an aluminum alloy. A nickel layer may be formed on a surface of the negative-electrode outer conductor 11.

Particularly preferably, the negative electrode terminal 10 is made of at least two types of metals, a part of the negative electrode terminal 10 inside the battery is made of copper or a copper alloy, and a part of the negative electrode terminal 10 outside the battery is made of aluminum or an aluminum alloy. Preferably, the negative-electrode outer conductor 11 made of aluminum or an aluminum alloy is connected to a part of the negative electrode terminal 10 made of aluminum or an aluminum alloy. Preferably, the negative-electrode current collector 9 made of copper or a copper alloy is connected to a part of the negative electrode terminal 10 made of copper or a copper alloy.

The sealing plate 2 has a liquid injection hole 17. After injecting an electrolyte solution into the battery case 100 from the liquid injection hole 17, the liquid injection hole 17 is sealed with a sealing plug 18.

The sealing plate 2 has a gas discharge valve 19 that breaks and discharges a gas from the inside to the outside of the battery case 100 if the pressure inside the battery case 100 becomes a predetermined pressure or higher.

Next, a method of manufacturing the rectangular secondary battery 20 will be described.

Production of Positive Electrode Plate

Positive electrode slurry including the following substances is prepared: a lithium-nickel-cobalt-manganese composite oxide, as a positive electrode active material; a polyvinylidene fluoride (PVdF), as a binder; a carbon material, as a conducting material; and an N-methyl-2-pyrrolidone (NMP), as a dispersion medium. The positive electrode slurry is applied to both surfaces of a strip-shaped aluminum foil having a thickness of 15 pub, which is a positive electrode core. By removing NMP from the positive electrode slurry by drying the slurry, positive-electrode-active-material mixture layers are formed on the positive electrode core. Subsequently, the positive-electrode-active-material mixture layers are compressed to have a predetermined thickness. A positive electrode plate, obtained as described above, is cut into a predetermined shape.

Figure 3:
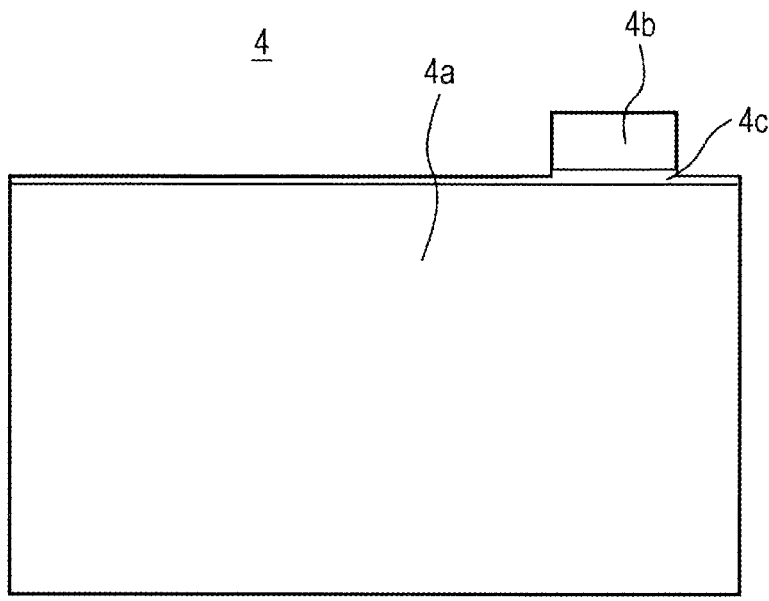
FIG. 3 is a plan view of a positive electrode plate according to the embodiment.

FIG. 3 is a plan view of a positive electrode plate 4 made by using the method described above. The positive electrode plate 4 has a body in which positive-electrode-active-material mixture layers 4a are formed on both surfaces of the rectangular positive electrode core. The positive electrode plate 4 has a positive electrode tab 4b. A part of the positive electrode core protrudes from an edge of the body, and the protruding part of the positive electrode core is the positive electrode tab 4b. Preferably, the positive electrode tab 4b is integrated with the positive electrode core and connected to the positive electrode plate 4 in this way. Preferably, a positive electrode protection layer 4c is formed on a part of the positive electrode core near the base of the positive electrode tab 4b. The positive electrode protection layer 4c is a layer having a lower electroconductivity than the positive-electrode-active-material mixture layer 4a. Preferably, the positive electrode protection layer 4c includes ceramic particles, which are made of alumina, silica, zirconia, or the like; and a binder. The positive electrode protection layer 4c may include electroconductive particles made or a carbon material or the like. As illustrated in FIG. 3, the width of the positive electrode protection layer 4c (in the left-right direction in FIG. 3) may be greater than the width of the positive electrode tab 4b. For example, the positive electrode protection layer 4c may be formed on the entire region at one end of the positive electrode plate 4. Note that the positive electrode protection layer 4c need not include ceramic particles and may be mainly made of an insulating resin.

Production of Negative Electrode Plate

Negative electrode slurry including the following substances is prepared: graphite, as a negative electrode active material; styrene-butadiene rubber (SBR), as a binder; carboxymethyl cellulose (CMC), as a thickener; and water. The negative electrode slurry is applied to both surfaces of a strip-shaped copper foil having a thickness of 8 μm, which is a negative electrode core. By removing water in the negative electrode slurry by drying the negative electrode slurry, negative-electrode-active-material mixture layers are formed on the negative electrode core. Subsequently, the negative-electrode-active-material mixture layers are compressed to have a predetermined thickness. A negative electrode plate, obtained as described above, is cut into a predetermined shape.

Figure 4:
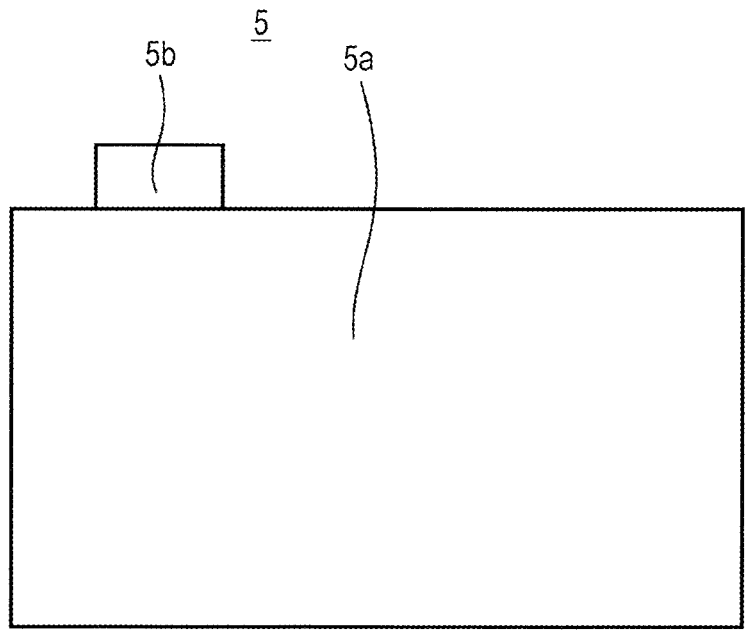
FIG. 4 is a plan view of a negative electrode plate according to the embodiment.

FIG. 4 is a plan view of a negative electrode plate 5 made by using the method described above. The negative electrode plate 5 has a body in which negative-electrode-active-material mixture layers 5a are formed on both surfaces of the rectangular negative electrode core. The negative electrode plate 5 has a negative electrode tab 5b. A part of the negative electrode core protrudes from an edge of the body, and the protruding part of the negative electrode core is the negative electrode tab 5b. Preferably, the negative electrode tab 5b is integrated with the negative electrode core and connected to the negative electrode plate 5 in this way.

Production of Electrode Body Element

Figure 5:
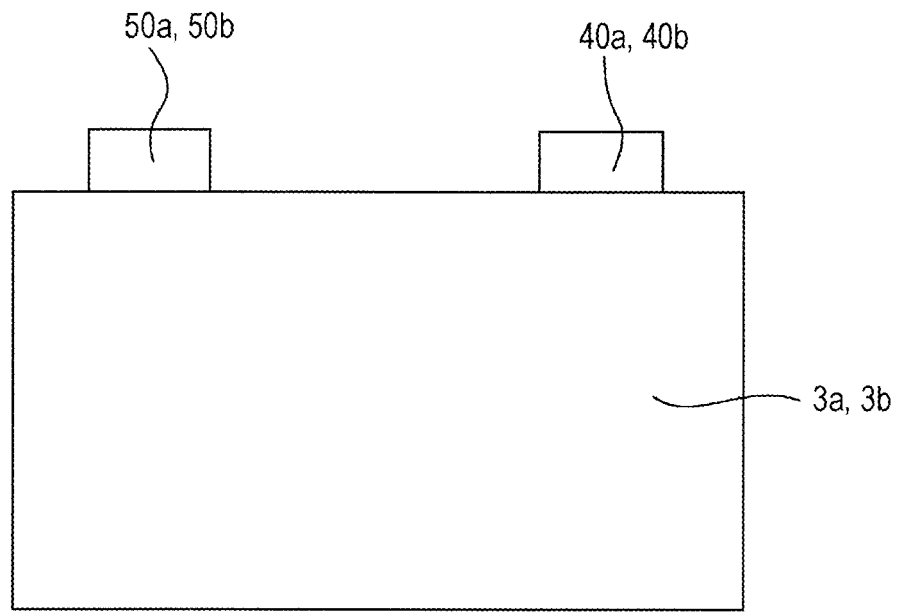
FIG. 5 is a plan view of an electrode body element according to the embodiment.

Fifty positive electrode plates 4 and fifty-one negative electrode plates 5 are produced by using the methods described above, and a stacked electrode body element is produced by stacking these electrode plates with rectangular polyolefin separators therebetween. As illustrated in FIG. 5, at one end portion of the electrode body element (a first electrode body element 3a, a second electrode body element 3b), the positive electrode tabs 4b of the positive electrode plates 4 are stacked and a positive-electrode tab group (a first positive-electrode tab group 40a, a second positive-electrode tab group 40b) is formed. At the other end portion of the electrode body element (the first electrode body element 3a, the second electrode body element 3b), the negative electrode tabs 5b of the negative electrode plates 5 are stacked and a negative-electrode tab group (a first negative-electrode tab group 50a, a second negative-electrode tab group 50b) is formed. Preferably, separators are disposed on both outer surfaces of the electrode body element, and the electrode plates and the separators are fixed in the stacked state by using a tape or the like. An adhesive layer may be used to bond the separators and the positive electrode plates 4 to each other and to bond the separator and the negative electrode plate 5 may to each other. The separator may have a bag-like shape, and the positive electrode plate 4 may be disposed in the separator. A strip-shaped separator may be used; and, in this case, the separator may be folded in a zigzag pattern, or the separator may be rolled up. The electrode body element may be a rolled element formed by rolling up a strip-shaped positive electrode plate and a strip-shaped negative electrode plate with a strip-shaped separator therebetween.

Attachment of Terminals and Outer Conductors to Sealing Plate

Figure 6:
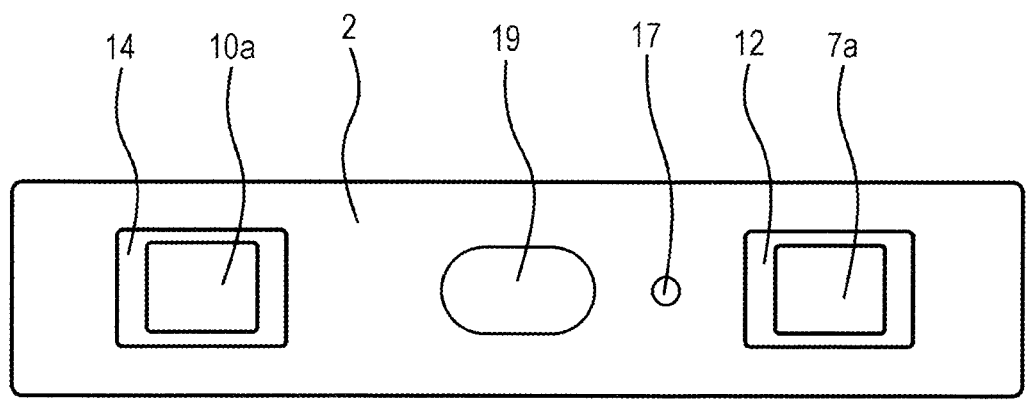
FIG. 6 illustrates a surface of a sealing plate facing the electrode body, after components have been attached.

Referring to FIGS. 2 and 6, a method of attaching the positive electrode terminal 7, the positive-electrode outer conductor 8, the negative electrode terminal 10, and the negative-electrode outer conductor 11 to the sealing plate 2 will be described. Because the same method can be used for the negative electrode side and the positive electrode side, the positive electrode side will be described as an example.

The outer insulator 13 and the positive-electrode outer conductor 8 are placed on a surface, facing the outside of the battery, of a part of the sealing plate 2 around the positive-electrode-terminal attachment hole 2a, and the inner insulator 12 is placed on a surface, facing the inside of the battery, of a part of the sealing plate 2 around the positive-electrode-terminal attachment hole 2a. Next, the insertion portion 7b of the positive electrode terminal 7 is inserted into the through-hole in the inner insulator 12, the positive-electrode-terminal attachment hole 2a in the sealing plate 2, the through-hole in the outer insulator 13, and the through-hole in the positive-electrode outer conductor 8. Then, the end portion of the insertion portion 7b is upset on the positive-electrode outer conductor 8. Thus, the upset portion 7c is formed. The positive electrode terminal 7, the inner insulator 12, the outer insulator 13, and the positive-electrode outer conductor 8 are fixed to the sealing plate 2. Preferably, the upset portion 7c of the positive electrode terminal 7 and the positive-electrode outer conductor 8 are welded to each other by energy beam welding, such as laser welding.

Connection of Current Collectors and Tabs

Figure 7:
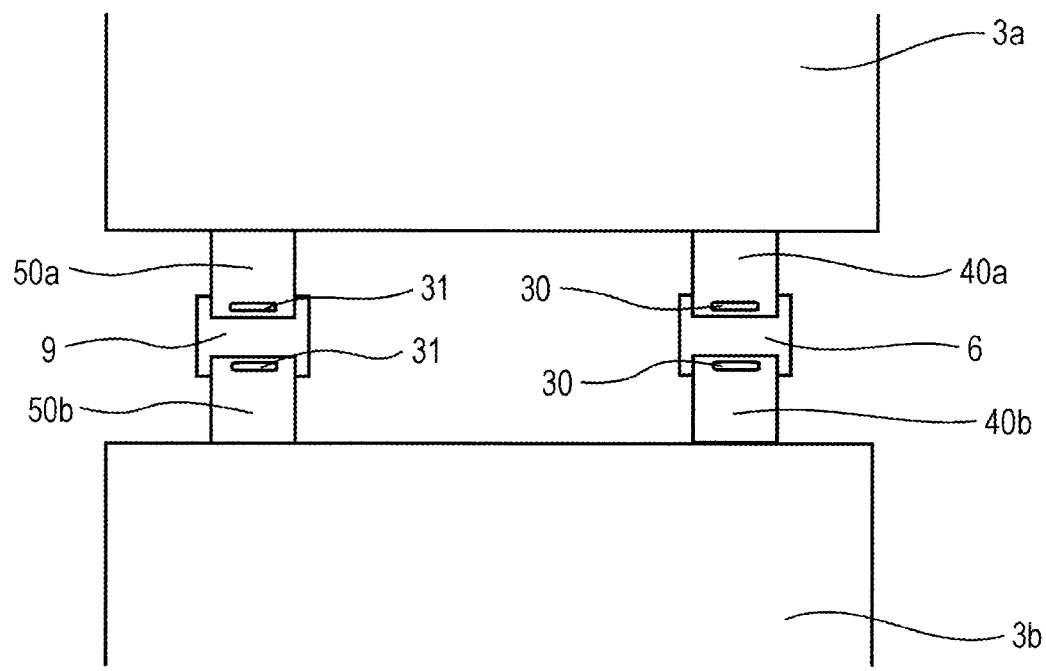
FIG. 7 illustrates a step of connecting tab groups to current collectors.

FIG. 7 illustrates a method of connecting the first positive-electrode tab group 40a and the second positive-electrode tab group 40b to the positive-electrode current collector 6, and connecting the first negative-electrode tab group 50a and the second negative-electrode tab group 50b to the negative-electrode current collector 9. By using the method described above, two electrode body elements, which are the first electrode body element 3a and the second electrode body element 3b, are produced. The first electrode body element 3a and the second electrode body element 3b may have the same structure or may have different structures.

The first electrode body element 3a is placed on one side of the positive-electrode current collector 6 and the negative-electrode current collector 9, each having a plate-like shape; and the second electrode body element 3b is placed on the other side of the positive-electrode current collector 6 and the negative-electrode current collector 9, each having a plate-like shape. The first positive-electrode tab group 40a of the first electrode body element 3a and the second positive-electrode tab group 40b of the second electrode body element 3b are welded to the positive-electrode current collector 6. Thus, joints 30 are formed. The first negative-electrode tab group 50a of the first electrode body element 3a and the second negative-electrode tab group 50b of the second electrode body element 3b are welded to the negative-electrode current collector 9. Thus, joints 31 are formed. A method of welding a tab group to a current collector is not particularly limited. The welding method is preferably ultrasonic welding, resistance welding, or energy beam welding; more preferably, ultrasonic welding or resistance welding; and most preferably, ultrasonic welding.

Connection of Terminals and Current Collectors

Figure 8:
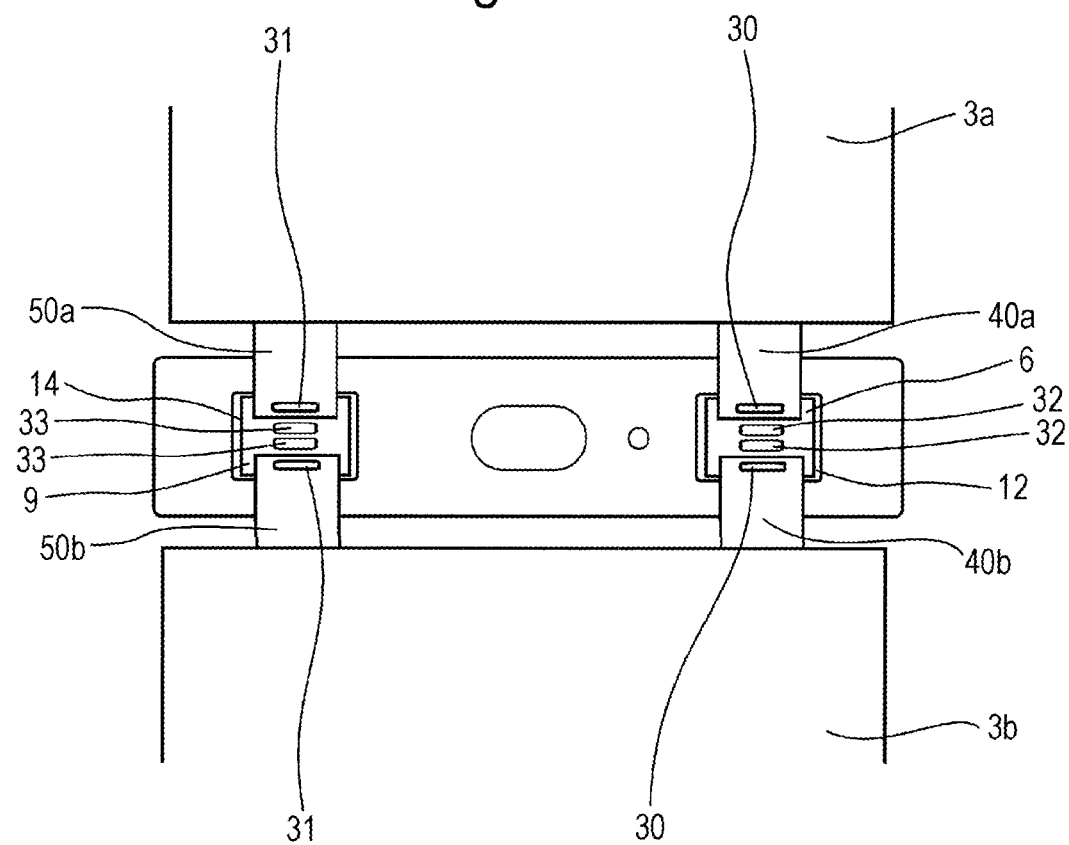
FIG. 8 illustrates a step of connecting the current collectors to flange portions of terminals.

As illustrated in FIG. 8, the positive-electrode current collector 6, to which the first positive-electrode tab group 40a and the second positive-electrode tab group 40b have been connected, is placed on the flange portion 7a of the positive electrode terminal 7. The negative-electrode current collector 9, to which the first negative-electrode tab group 50a and the second negative-electrode tab group 50b have been connected, is placed on the flange portion 10a of the negative electrode terminal 10. Subsequently, the positive-electrode current collector 6 is welded to the flange portion 7a of the positive electrode terminal 7. Thus, joints 32 are formed. The negative-electrode current collector 9 is welded to the flange portion 10a of the negative electrode terminal 10. Thus, joints 33 are formed. Preferably, a method of welding a current collector a flange portion of a terminal is energy beam welding, such as laser welding. However, another method, such as ultrasonic welding, may be used. Preferably, the joints 32 and the joints 33 are formed at a plurality of positions. However, the joint 32 and the joint 33 may each be formed at one position.

Preferably, the inner insulator 12 includes an engagement portion that engages with the positive-electrode current collector 6 when the positive-electrode current collector 6 is placed on the flange portion 7a of the positive electrode terminal 7. For example, preferably, the engagement portion has a hook-shaped portion, and engages with and fixes the positive-electrode current collector 6. Preferably, the inner insulator 14 has an engagement portion that engages with the negative-electrode current collector 9 when the negative-electrode current collector 9 is placed on the flange portion 10a of the negative electrode terminal 10. For example, preferably, the engagement portion has a hook-shaped portion, and engages with and fixes the negative-electrode current collector 9.

Production of Electrode Body

After connecting the positive-electrode current collector 6 to the positive electrode terminal 7 and connecting the negative-electrode current collector 9 to the negative electrode terminal 10, the electrode body 3 is formed by combining the first electrode body element 3a and the second electrode body element 3b together, while bending the first positive-electrode tab group 40a, the second positive-electrode tab group 40b, the first negative-electrode tab group 50a, and the second negative-electrode tab group 50b. At this time, one of outer surfaces of the first electrode body element 3a and one of outer surfaces of the second electrode body element 3b are made to face each other directly or with another member therebetween. The first electrode body element 3a and the second electrode body element 3b can be fixed to each other by using a tape or the like. Alternatively, one of outer surfaces of the first electrode body element 3a and one of outer surfaces of the second electrode body element 3b can be bonded to each other by using an adhesive layer. The first electrode body element 3a and the second electrode body element 3b need not be fixed together.

Assembly of Rectangular Secondary Battery

The electrode body 3, which has been formed by combining the electrode body elements together, is placed in the insulating sheet 16 made of a resin, which has been folded to have a box-like shape. The electrode body 3, placed in the insulating sheet 16, is inserted into the rectangular casing 1. Then, the rectangular casing 1 and the sealing plate 2 are welded to each other, and the opening of the rectangular casing 1 is sealed with the sealing plate 2. Subsequently, an electrolyte is injected from the liquid injection hole 17 of the sealing plate 2, and the liquid injection hole 17 is sealed with the sealing plug 18.

Rectangular Secondary Battery

Figure 9:
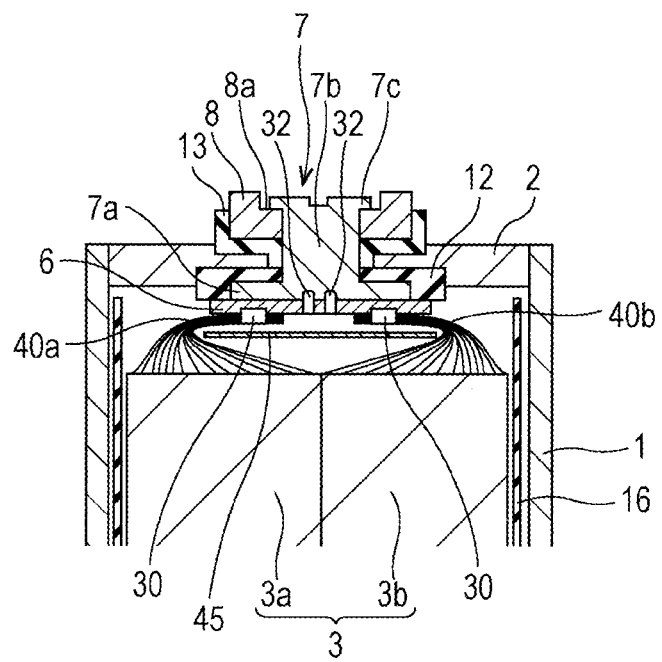
FIG. 9 is a sectional view of a region near a positive electrode terminal, taken along line IX-IX in FIG. 1.

FIG. 9 is a sectional view of a region near the positive electrode terminal 7 of the rectangular secondary battery 20, taken along line IX-IX in FIG. 1. In the rectangular secondary battery 20, the first positive-electrode tab group 40a of the first electrode body element 3a and the second positive-electrode tab group 40b of the second electrode body element 3b are disposed between the sealing plate 2 and the electrode body 3 in a state in which the first positive-electrode tab group 40a and the second positive-electrode tab group 40b are bent in different directions. This structure allows a space between the sealing plate 2 and the electrode body 3 to be reduced. Thus, the proportion of a space occupied by the electrode body 3 in the battery case 100 can be increased, and the rectangular secondary battery can have higher volumetric energy density. The first negative-electrode tab group 50a and the second negative-electrode tab group 50b are also bent in different directions.

Moreover, in the rectangular secondary battery 20, the positive electrode terminal 7 has the flange portion 7a at a position nearer than the sealing plate 2 to the electrode body 3. The positive electrode terminal 7 is upset on the positive-electrode outer conductor 8 at a position further outward from the sealing plate 2 with respect to the battery. This structure can reliably prevent a burr or the like, which may be generated at the upset portion 7c when forming the upset portion 7c by upsetting the end portion of the insertion portion 7b of the positive electrode terminal 7, from being removed from the positive electrode terminal 7 and entering the electrode body. Thus, the rectangular secondary battery can have higher reliability.

Because the positive-electrode current collector 6 is welded to a surface of the flange portion 7a of the positive electrode terminal 7 facing the electrode body 3, the positive electrode terminal 7 and the positive-electrode current collector 6 can be more stably connected to each other, compared with a case where the positive-electrode current collector 6 is welded to an upset portion of the positive electrode terminal 7.

In the method of manufacturing the rectangular secondary battery 20 described above, after connecting the first positive-electrode tab group 40a and the second positive-electrode tab group 40b to the positive-electrode current collector 6, the positive-electrode current collector 6 is connected to the flange portion 7a of the positive electrode terminal 7; and, subsequently, the first electrode body element 3a and the second electrode body element 3b are combined together while bending the first positive-electrode tab group 40a and the second positive-electrode tab group 40b. Therefore, the space between the sealing plate 2 and the electrode body 3 can be reduced. Thus, the rectangular secondary battery can have higher volumetric energy density.

In a case where the first electrode body element 3a and the second electrode body element 3b are each a stacked element including a plurality of positive electrode plates and a plurality of negative electrode plates, preferably, the positive electrode plates and the separators are bonded to each other and the separators and the negative electrode plates are bonded to each other. With this structure, when bending the first positive-electrode tab group 40a and the second positive-electrode tab group 40b, it is possible to prevent displacement between the positive electrode plates and the separators that are stacked and displacement between the separators and the negative electrode plates that are stacked. Preferably, bonding of the positive electrode plates and the separators and bonding of the separators and the negative electrode plates are performed by placing adhesive layers between the positive electrode plates and the separators and between the separators and the negative electrode plates.

The first electrode body element 3a and the second electrode body element 3b may each be a rolled element in which a strip-shaped positive electrode plate and a strip-shaped negative electrode plate are respectively rolled up with a separator therebetween. When the first electrode body element 3a and the second electrode body element 3b are rolled elements, when bending the first positive-electrode tab group 40a and the second positive-electrode tab group 40b, it is possible to prevent displacement between the positive electrode plate and the separator and displacement between the negative electrode plate and the separator. Note that, when the first electrode body element 3a and the second electrode body element 3b are rolled elements, one positive electrode plate may have a plurality of positive electrode tabs that are arranged at intervals, and one negative electrode plate may have a plurality of negative electrode tabs that are arranged at intervals.

In a case where the first positive-electrode tab group 40a and the second positive-electrode tab group 40b are made of aluminum or an aluminum alloy, when bending the first positive-electrode tab group 40a and the second positive-electrode tab group 40b, a crack or a cut may be formed in the bases of the first positive-electrode tab group 40a and the second positive-electrode tab group 40b. The positive electrode protection layer 4c is disposed in a region of the positive electrode plate 4 near the base of the positive electrode tab 4b. Therefore, the region near the base of the positive electrode tab 4b is reinforced by the positive electrode protection layer 4c. Thus, it is possible to effectively prevent forming of a crack or a cut in the region near the base of the positive electrode tab 4b. It is more effective to dispose the positive electrode protection layer 4c in the entirety region of one end portion of the positive electrode plate 4 at which the positive electrode tab 4b is disposed. Note that the negative electrode plate 5 need not have a protection layer.

Preferably, an insulator 45 is disposed between the electrode body 3 and a region of the first positive-electrode tab group 40a connected to the positive-electrode current collector 6 and between the electrode body 3 and a region of the second positive-electrode tab group 40b connected to the positive-electrode current collector 6. This structure can prevent forming of an unintended electric current path. Preferably, the insulator 45 is an insulating tape that is affixed to the first positive-electrode tab group 40a and the second positive-electrode tab group 40b. Alternatively, the insulator 45 may be a resin component connected to the inner insulator 12. Preferably, the insulator 45 is placed at a predetermined position after the positive-electrode current collector 6 has been connected to the positive electrode terminal 7 and before the first electrode body element 3a and the second electrode body element 3b are combined together.

Preferably, a recess 8a is formed in an upper surface of the positive-electrode outer conductor 8, and the upset portion 7c of the positive electrode terminal 7 is disposed in the recess 8a in the upper surface of the positive-electrode outer conductor 8. This structure can prevent damage to the upset portion 7c, which may occur if a manufacturing device, a jig, or the like contacts the upset portion 7c.

Although description of the structure of the negative electrode side will be omitted, the structure may be the same as that of the positive electrode side.

As illustrated in FIG. 8, the joint 31 between the first negative-electrode tab group 50a and the negative-electrode current collector 9, the joint 31 between the second negative-electrode tab group 50b and the negative-electrode current collector 9, and the joints 33 between the negative-electrode current collector 9 and the negative electrode terminal 10 are disposed on a straight line extending in the transversal direction of the sealing plate 2. This structure can prevent, in a case where the rectangular secondary battery includes a pressure-sensitive short-circuit mechanism, the negative-electrode current collector 9 from covering a deformable portion of the short-circuit mechanism. Therefore, it is possible to prevent the negative-electrode current collector 9 from blocking flow of a gas toward a lower side of the deformable portion.

First Modification

Figure 10:
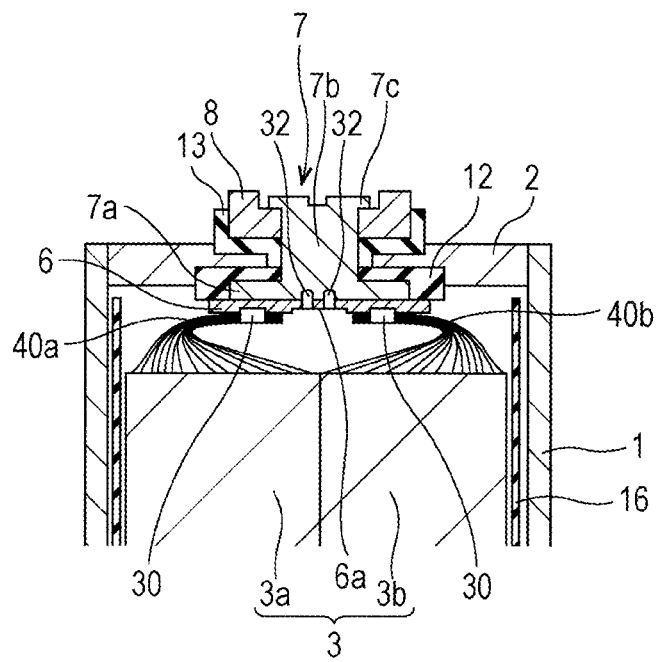
FIG. 10 is a sectional view of a rectangular secondary battery according to a first modification, corresponding to FIG. 9.

FIG. 10 is a sectional view of a rectangular secondary battery according to a first modification, corresponding to FIG. 9. The structure of the rectangular secondary battery according to the first modification differs from the structure of the rectangular secondary battery 20 according to the embodiment in the shape of the positive-electrode current collector 6. In the rectangular secondary battery according to the first modification, the positive-electrode current collector 6 has a current collector recess 6a in a surface thereof facing the electrode body 3. At the current collector recess 6a of the positive-electrode current collector 6, the positive-electrode current collector 6 is welded to a surface of the flange portion 7a of the positive electrode terminal 7 facing the electrode body 3. This structure allows the positive electrode terminal 7 and the positive-electrode current collector 6 to be more reliably welded to each other.

Moreover, it is possible to increase the thickness of portions of the positive-electrode current collector 6 that are to be connected to the first positive-electrode tab group 40a and the second positive-electrode tab group 40b when ultrasonic-welding the first positive-electrode tab group 40a and the second positive-electrode tab group 40b to the positive-electrode current collector 6. Therefore, deformation of the positive-electrode current collector 6 can be suppressed. The thickness of a portion of the positive-electrode current collector 6 to be connected to the positive electrode terminal 7 may have a comparative small thickness so that welding can be reliably performed by energy beam welding. In this case, energy used for welding can be reduced, and therefore it is possible to prevent deterioration of the inner insulator 12 and the like due to welding heat.

Second Modification

Figure 11:
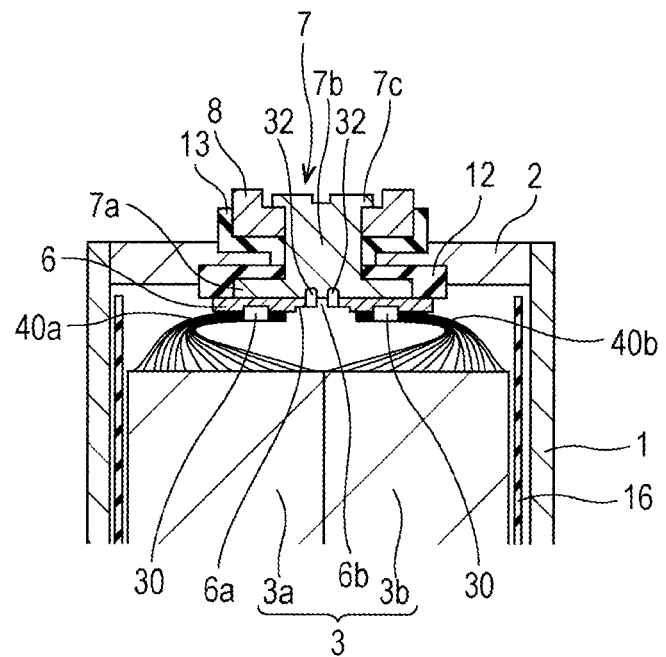
FIG. 11 is a sectional view of a rectangular secondary battery according to a second modification, corresponding to FIG. 9.

FIG. 11 is a sectional view of a rectangular secondary battery according to a second modification, corresponding to FIG. 9. The structure of the rectangular secondary battery according to the second modification differs from the structure of the rectangular secondary battery 20 according to the embodiment in the shape of the positive-electrode current collector 6. In the rectangular secondary battery according to the second modification, the positive-electrode current collector 6 has a connection opening 6b. An edge portion of the connection opening 6b of the positive-electrode current collector 6 is welded to a surface of the flange portion 7a of the positive electrode terminal 7 facing the electrode body 3. This structure allows the positive electrode terminal 7 and the positive-electrode current collector 6 to be more reliably welded to each other. The positive-electrode current collector 6 may have the current collector recess 6a, and the connection opening 6b may be formed in the current collector recess 6a. Note that the positive-electrode current collector 6 need not have the current collector recess 6a.

Third Modification

Figure 12:
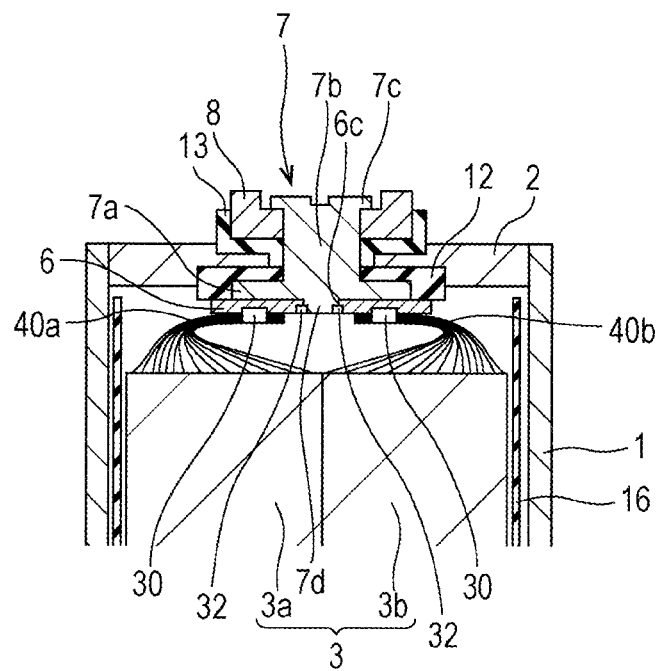
FIG. 12 is a sectional view of a rectangular secondary battery according to a third modification, corresponding to FIG. 9.

FIG. 12 is a sectional view of a rectangular secondary battery according to a third modification, corresponding to FIG. 9. The structure of the rectangular secondary battery according to the third modification differs from the structure of the rectangular secondary battery 20 according to the embodiment in the shape of the positive-electrode current collector 6 and the shape of the positive electrode terminal 7. In the rectangular secondary battery according to the third modification, the positive-electrode current collector 6 has a fitting opening 6c, and the flange portion 7a of the positive electrode terminal 7 has a fitting protrusion 7d on a surface thereof facing the electrode body 3. The fitting protrusion 7d of the positive electrode terminal 7 is fitted into the fitting opening 6c of the positive-electrode current collector 6. Then, the fitting portions of the positive-electrode current collector 6 and the positive electrode terminal 7 are welded to each other by energy beam welding, such as laser welding. This structure can improve the reliability of the joint between the positive-electrode current collector 6 and the positive electrode terminal 7. The positive-electrode current collector 6 and the positive electrode terminal 7 can be more reliably and securely connected to each other, even if the positive-electrode current collector 6 is flexurally deformed when the first positive-electrode tab group 40a and the second positive-electrode tab group 40b are welded to the positive-electrode current collector 6. Note that flexural deformation the positive-electrode current collector 6 tends to occur when ultrasonic-welding or resistance-welding the first positive-electrode tab group 40a and the second positive-electrode tab group 40b to the positive-electrode current collector 6. Preferably, the positive-electrode current collector 6 has a plurality of fitting openings 6c and the positive electrode terminal 7 has a plurality of fitting protrusions 7d, and these are respectively fitted to each other.

Fourth Modification

Figure 13:
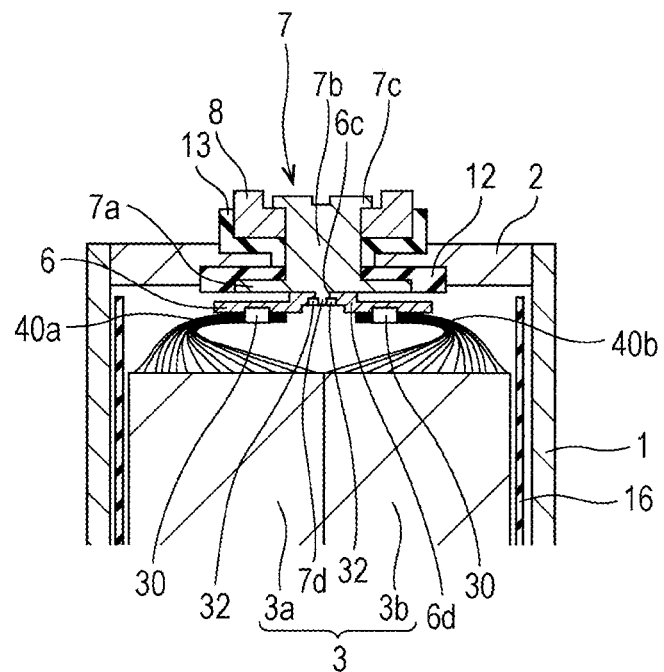
FIG. 13 is a sectional view of a rectangular secondary battery according to a fourth modification, corresponding to FIG. 9.

FIG. 13 is a sectional view of a rectangular secondary battery according to a fourth modification, corresponding to FIG. 9. The structure of the rectangular secondary battery according to the fourth modification differs from the structure of the rectangular secondary battery 20 according to the embodiment in the shape of the positive-electrode current collector 6 and the shape of the positive electrode terminal 7. In the rectangular secondary battery according to the fourth modification, the positive-electrode current collector 6 has a fitting opening 6c, and the flange portion 7a of the positive electrode terminal 7 has a fitting protrusion 7d on a surface thereof facing the electrode body 3. The fitting protrusion 7d of the positive electrode terminal 7 is fitted into the fitting opening 6c of the positive-electrode current collector 6. The positive-electrode current collector 6 has a region connected to the positive electrode terminal 7 and regions connected to the first positive-electrode tab group 40a and the second positive-electrode tab group 40b. The positive-electrode current collector 6 has a stepped portion 6d between the region connected to the positive electrode terminal 7 and the regions connected to the first positive-electrode tab group 40a and the second positive-electrode tab group 40b. The regions of the positive-electrode current collector 6 connected to the first positive-electrode tab group 40a and the second positive-electrode tab group 40b are separated from the flange portion 7a of the positive electrode terminal 7 in a direction perpendicular to the sealing plate 2. This structure allows the positive-electrode current collector 6 and the positive electrode terminal 7 to be more reliably and securely connected to each other, even if the positive-electrode current collector 6 is flexurally deformed when the first positive-electrode tab group 40a and the second positive-electrode tab group 40b are welded to the positive-electrode current collector 6. When the first positive-electrode tab group 40a and the second positive-electrode tab group 40b are welded to the positive-electrode current collector 6, even if irregularities are formed in the surfaces, facing the flange portion 7a, of regions of the positive-electrode current collector 6 connected to the first positive-electrode tab group 40a and the second positive-electrode tab group 40b, it is possible to prevent inappropriate contact between the positive-electrode current collector 6 and the flange portion 7a of the positive electrode terminal 7 due to the irregularities. Note that the positive-electrode current collector 6 need not have the stepped portion 6d. The positive-electrode current collector 6 may have a shape such that the positive-electrode current collector 6 gradually separates from the flange portion 7a of the positive electrode terminal 7 from the center thereof to an end thereof in the transversal direction of the sealing plate 2.

Fifth Modification

Figure 14:
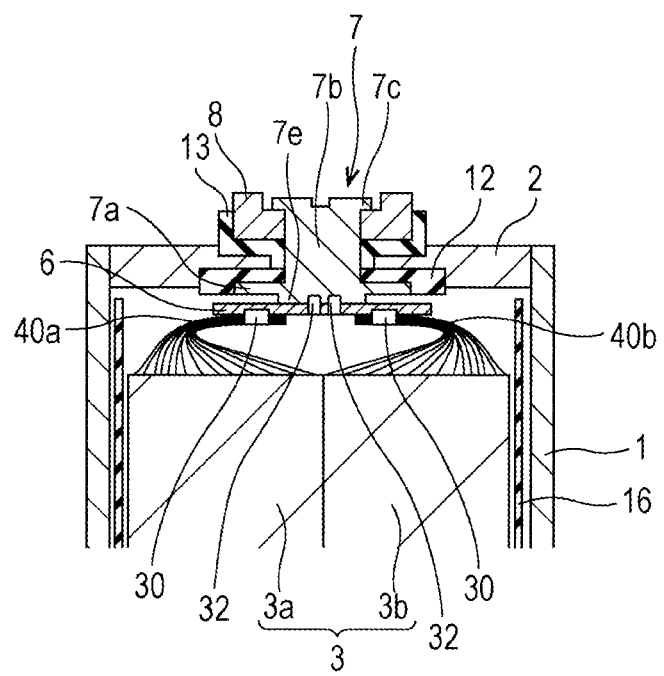
FIG. 14 is a sectional view of a rectangular secondary battery according to a fifth modification, corresponding to FIG. 9.

FIG. 14 is a sectional view of a rectangular secondary battery according to a fifth modification, corresponding to FIG. 9. The structure of the rectangular secondary battery according to the fifth modification differs from the structure of the rectangular secondary battery 20 according to the embodiment in the shape of the positive electrode terminal 7. In the rectangular secondary battery according to the fifth modification, the flange portion 7a of the positive electrode terminal 7 has a terminal protrusion 7e on a surface thereof facing the electrode body 3. The positive-electrode current collector 6 is welded to a surface of the terminal protrusion 7e of the positive electrode terminal 7 facing the electrode body 3. This structure allows the positive-electrode current collector 6 and the positive electrode terminal 7 to be more reliably and securely connected to each other, even if the positive-electrode current collector 6 is flexurally deformed when the first positive-electrode tab group 40a and the second positive-electrode tab group 40b are welded to the positive-electrode current collector 6. When the first positive-electrode tab group 40a and the second positive-electrode tab group 40b are welded to the positive-electrode current collector 6, even if irregularities are formed in the surfaces, facing the flange portion 7a, of regions of the positive-electrode current collector 6 connected to the first positive-electrode tab group 40a and the second positive-electrode tab group 40b, it is possible to prevent inappropriate contact between the positive-electrode current collector 6 and the flange portion 7a of the positive electrode terminal 7 due to the irregularities.

The structures of the first to fifth modifications can be applied to the negative-electrode current collector 9 and the negative electrode terminal 10.

Sixth Modification

Figure 15A:
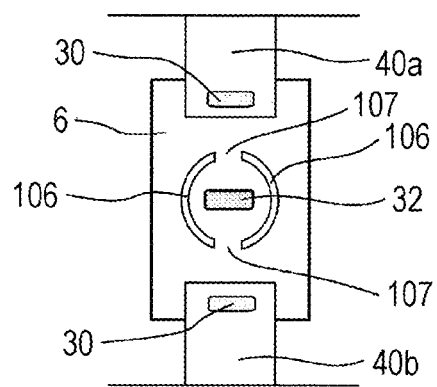
FIG. 15A illustrates a region near a positive-electrode current collector of a rectangular secondary battery according to a sixth modification.

FIG. 15A is an enlarged view of a region near a positive-electrode current collector 6 of a rectangular secondary battery according to a sixth modification. The structure of the rectangular secondary battery according to the sixth modification differs from the structure of the rectangular secondary battery 20 according to the embodiment in the shape of the positive-electrode current collector 6. In the rectangular secondary battery according to the sixth modification, the positive-electrode current collector 6 has a pair of fuse holes 106 around the joint 32 between the positive-electrode current collector 6 and the positive electrode terminal 7. Fuse portions 107 are formed between the pair of fuse holes 106. Preferably, the fuse portions 107 are configured to blow when an overcurrent flows through the rectangular secondary battery. Preferably, an insulating layer, an insulating sheet, an insulating tape, or the like is disposed in a region between the flange portion 7a of the positive electrode terminal 7 and the positive-electrode current collector 6, excluding the joint 32 between the flange portion 7a of the positive electrode terminal 7 and the positive-electrode current collector 6. In this case, it is possible to reliably prevent forming of a conduction path between the positive electrode plate 4 and the positive electrode terminal 7 after the fuse portions 107 have blown. Preferably, the fuse portions are formed in a positive-electrode current collector made of aluminum or an aluminum alloy.

Seventh Modification

Figure 15B:
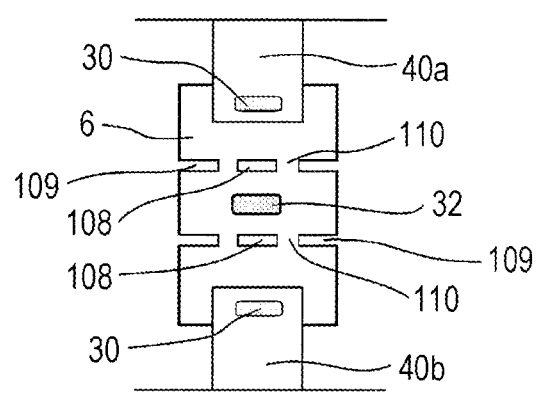
FIG. 15B illustrates a region near a positive-electrode current collector of a rectangular secondary battery according to a seventh modification.

FIG. 15B is an enlarged view a region near a positive-electrode current collector 6 of a rectangular secondary battery according to a seventh modification. The structure of the rectangular secondary battery according to the seventh modification differs from the structure of the rectangular secondary battery 20 according to the embodiment in the shape of the positive-electrode current collector 6. In the rectangular secondary battery according to the seventh modification, the positive-electrode current collector 6 has a pair of fuse holes 108 around the joint 32 between the positive-electrode current collector 6 and the positive electrode terminal 7. Moreover, the positive-electrode current collector 6 has cutouts 109 at positions adjacent to the fuse holes 108. Fuse portions 110 are formed between the fuse holes 108 and the cutouts 109. Preferably, the fuse portions 110 are configured to blow when an overcurrent flows through the rectangular secondary battery.

Eighth Modification

Figure 16A:
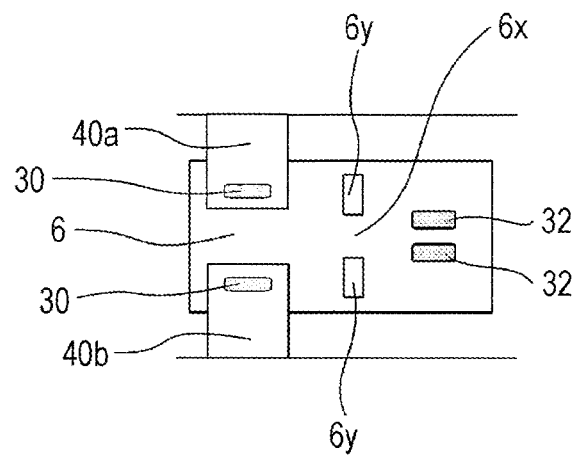
FIG. 16A illustrates a region near a positive-electrode current collector of a rectangular secondary battery according to an eighth modification.

FIG. 16A is an enlarged view of a region near a positive-electrode current collector 6 of a rectangular secondary battery according to an eighth modification. The structure of the rectangular secondary battery according to the eighth modification differs from the structure of the rectangular secondary battery 20 according to the embodiment in the shape of the positive-electrode current collector 6. In the rectangular secondary battery according to the eighth modification, in the longitudinal direction of the sealing plate 2, the position of the joints 32 between the positive electrode terminal 7 and the positive-electrode current collector 6 is displaced from the position of the joints 30 between the positive-electrode current collector 6 and the first and second positive-electrode tab group 40a and 40b. This structure allows the positive-electrode current collector 6 and the positive electrode terminal 7 to be more reliably and securely connected to each other, even if the positive-electrode current collector 6 is flexurally deformed when the first positive-electrode tab group 40a and the second positive-electrode tab group 40b are welded to the positive-electrode current collector 6. When the first positive-electrode tab group 40a and the second positive-electrode tab group 40b are welded to the positive-electrode current collector 6, even if irregularities are formed in the surface, facing the flange portion 7a, of regions of the positive-electrode current collector 6 connected to the first positive-electrode tab group 40a and the second positive-electrode tab group 40b, it is possible to prevent inappropriate contact between the positive-electrode current collector 6 and the flange portion 7a of the positive electrode terminal 7 due to the irregularities.

Preferably, the positive-electrode current collector 6 has a fuse portion 6x between the joints 32 between the positive electrode terminal 7 and the positive-electrode current collector 6 and the joints 30 between the positive-electrode current collector 6 and the first and second positive-electrode tab groups 40a and 40b in the longitudinal direction of the sealing plate 2. Preferably, the fuse portion 6x is configured to blow when an overcurrent flows through the rectangular secondary battery. The structure of the eighth modification can easily prevent a conduction path from being formed again after the fuse portion 6x has blown. Preferably, the fuse portion 6x is formed by forming fuse holes 6y or the like in the positive-electrode current collector 6. In addition to or instead of the fuse holes 6y, cutouts or grooves may be formed.

Figure 16B:
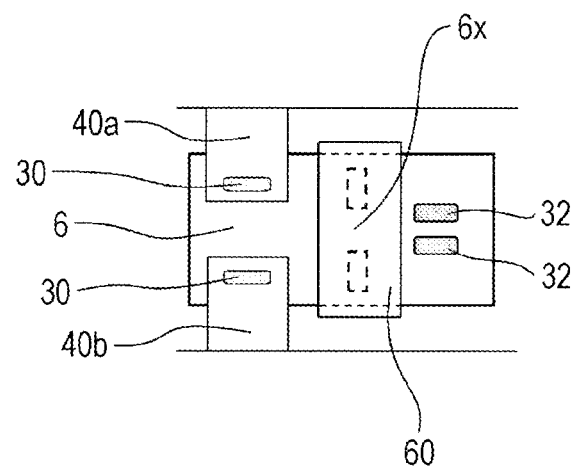
FIGS. 16B and 16C each illustrate an in which a tape is affixed to a positive-electrode current collector.
Figure 16C:
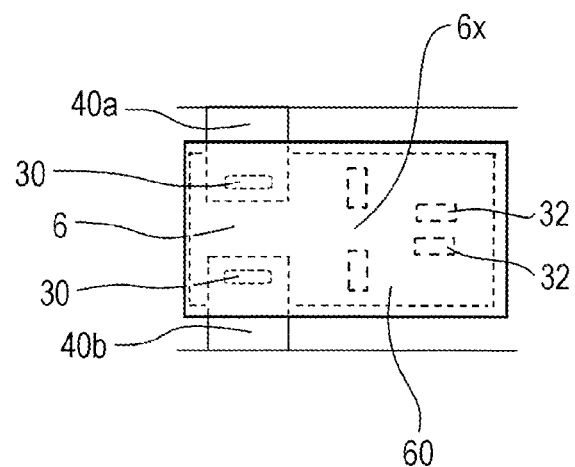

Preferably, an insulating tape 60 is affixed to the fuse portion 6x of the positive-electrode current collector 6 as illustrated in FIG. 16B. This structure can suppress splashing of molten metal when the fuse portion 6x blows. More preferably, the insulating tape 60 is disposed also on the joints 30 and the joints 32 as illustrated in FIG. 16C. Preferably, one insulating tape 60 extending in the longitudinal direction of the sealing plate 2 is affixed to the joints 30, the fuse portion 6x, and the joints 32. This structure can prevent forming of an unintended conduction path.

Figure 17:
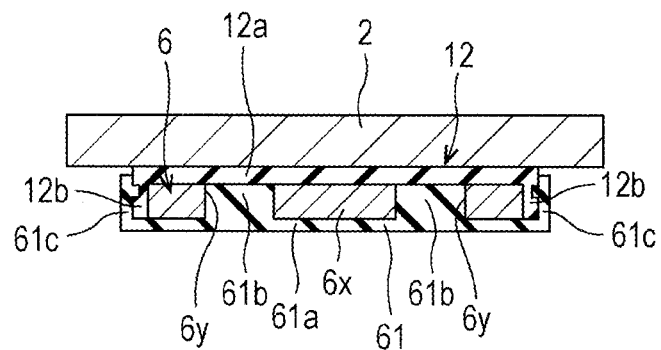
FIG. 17 is a sectional view of a region near a fuse portion of the positive-electrode current collector of the rectangular secondary battery according to the eighth modification, taken in the transversal direction a sealing plate.

In the rectangular secondary battery according to the eighth modification, a resin cover 61 may be disposed so as to cover the fuse portion 6x. FIG. 17 is a sectional view of a region near the fuse portion 6x of the positive-electrode current collector 6, taken in the transversal direction of the sealing plate 2. The cover 61 includes a body 61a that covers the fuse portion 6x. The body 61a can suppress splashing of molten metal when the fuse portion 6x blows. Preferably, the cover 61 has protrusions 61b on a surface of the body 61a facing the sealing plate 2, and the protrusions 61b are disposed in the fuse holes 6y of the positive-electrode current collector 6. This structure can prevent damage or breakage of the positive-electrode current collector 6 even if vibration or a strong impact is applied to the rectangular secondary battery. Preferably, the cover 61 has a pair of vertical walls 61c at ends thereof, and the pair of vertical walls 61c are each connected to a corresponding one of walls 12b of the inner insulator 12. Note that, preferably, the inner insulator 12 includes an insulator body 12a, which is disposed between the sealing plate 2 and the positive-electrode current collector 6, and the walls 12b, which are formed at the ends of the insulator body 12a. Preferably, the inner insulator 12 and the cover 61 are fixed to each other by being snap-fit. Preferably, the cover 61 extends to a position where the cover 61 faces the joints 30 and the joints 32. Note that the protrusions 61b of the cover 61 may be omitted. Preferably, a portion of the positive-electrode current collector 6 around the fuse portion 6x is molded with the resin cover 61. Preferably, the first electrode body element 3a and the second electrode body element 3b are combined together after the cover 61 has been attached.

Structure of Electrode Body

An electrode body may include a plurality of rolled electrode body elements. This structure is preferable, because this structure can reliably prevent the positive electrode plate, the separator, and the negative electrode plate from becoming displaced from each other when bending the positive-electrode tab group and the negative-electrode tab group. A rolled electrode body element is produced by rolling up a strip-shaped positive electrode plate and a strip-shaped negative electrode plate with a strip-shaped separator therebetween. The strip-shaped positive electrode plate has a plurality of positive electrode tabs formed at an end in the width direction thereof. The plurality of positive electrode tabs are arranged at predetermined intervals in the longitudinal direction of the positive electrode plate. The strip-shaped negative electrode plate has a plurality of negative electrode tabs formed at an end in the width direction thereof. The plurality of negative electrode tabs are disposed at predetermined intervals in the longitudinal direction of the negative electrode plate. Preferably, in each of the electrode body elements, the number of positive electrode tabs is less than the number of layers of the positive electrode plate that are stacked in the thickness direction of the electrode body element. Preferably, in each of the electrode body elements, the number of negative electrode tabs is less than the number of layers of the negative electrode plate that are stacked in the thickness direction of the electrode body element. In this case, when a tab group is bent, generation of a gap between the electrode plates or displacement of the electrode plates from each other can be suppressed.

Figure 18:
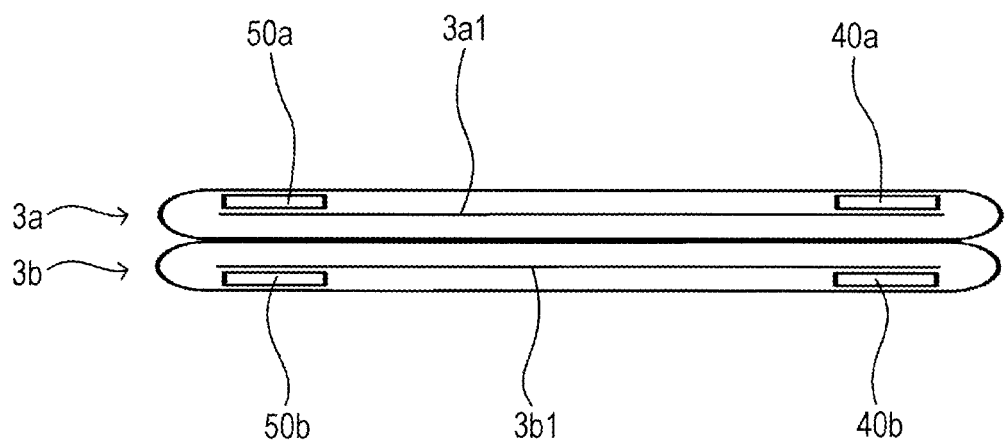
FIG. 18 illustrates a surface of an electrode body including two rolled electrode body elements, on which tab groups are disposed.

FIG. 18 illustrates a surface, on which tab groups are disposed, of an electrode body that is composed of the first electrode body element 3a and the second electrode body element 3b, each of which is a rolled element. In the rectangular secondary battery, the first electrode body element 3a and the second electrode body element 3b, each of which is a rolled element, are disposed in the rectangular casing 1 in such a way that the roll axes thereof are perpendicular to the sealing plate.

Figure 19:
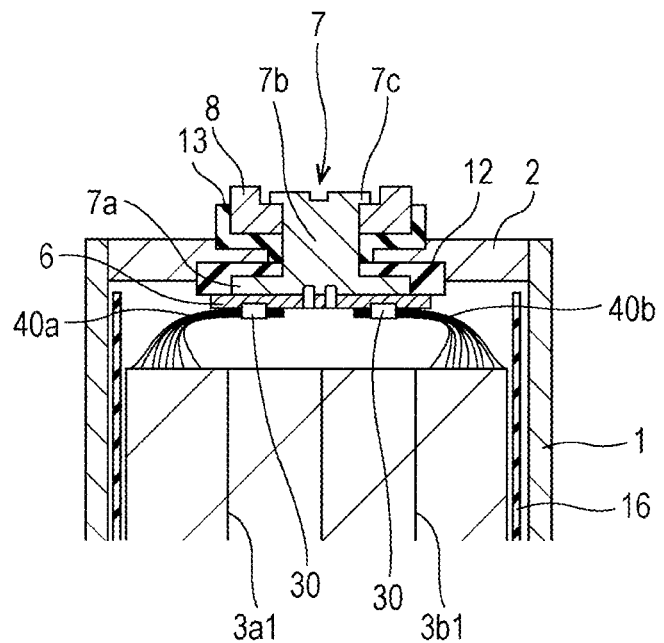
FIG. 19 is a sectional view of a rectangular secondary battery including an electrode body including two rolled electrode body elements, corresponding to FIG. 9.

The first electrode body element 3a and the second electrode body element 3b may differ from each other in the positions where the positive-electrode tab group and the negative-electrode tab group are formed. As illustrated in FIG. 18, in the first electrode body element 3a, the first positive-electrode tab group 40a and the first negative-electrode tab group 50a are formed at positions on one side of a roll-center portion 3a1 of the first electrode body element 3a in the thickness direction of the first electrode body element 3a. In the second electrode body element 3b, the second positive-electrode tab group 40b and the second negative-electrode tab group 50b are formed at positions on the other side of a roll-center portion 3b1 of the second electrode body element 3b in the thickness direction of the second electrode body element 3b. Preferably, as illustrated in FIG. 19, by using the first electrode body element 3a and the second electrode body element 3b, the first positive-electrode tab group 40a, the first negative-electrode tab group 50a, the second positive-electrode tab group 40b, and the second negative-electrode tab group 50b are each connected to the positive-electrode current collector 6. This configuration allows a space occupied by the tab groups to be reduced while reducing a load applied to the tab groups and the joints 30, and therefore the rectangular secondary battery can easily have higher volumetric energy density.

In a rolled electrode body element, if the positive-electrode tab group and the negative-electrode tab group are formed only on one side of the roll-center portion, the number of tab groups that are stacked and connected to the current collector can be reduced. Thus, the tab groups can be more easily and reliably welded to the current collectors. Preferably, the number of positive electrode tabs is less than the number of layers of the positive electrode plate that are stacked, in order that the tab groups can be more easily and reliably welded to the current collectors. Preferably, the ratio of the number of positive electrode tabs to the number of layers of the positive electrode plate that are stacked is 0.6 or lower, and more preferably, 0.5 or lower. Preferably, the ratio of the number of positive electrode tabs to the number of layers of the positive electrode plate that are stacked is 0.2 or higher, and more preferably, 0.4 or higher. The same applies to the negative electrode side.

Figure 20:
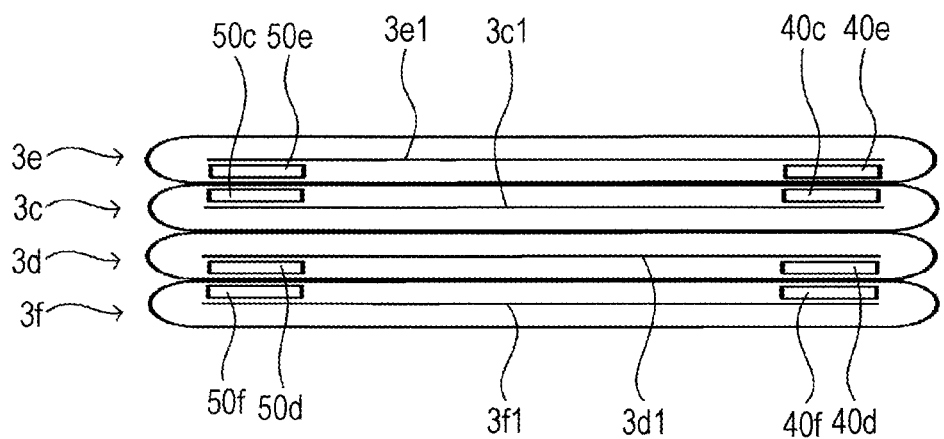
FIG. 20 illustrates a surface of an electrode body including four rolled electrode body elements, on which tab groups are disposed.

The electrode body may include four rolled electrode body elements. FIG. 20 illustrates a surface of an electrode body including a first electrode body element 3c, a second electrode body element 3d, a third electrode body element 3e, and a fourth electrode body element 3f, on which tab groups are disposed. The first electrode body element 3c has a first positive-electrode tab group 40c and a first negative-electrode tab group 50c at positions nearer than a roll-center portion 3c1 to the outer surface thereof (above the roll-center portion 3c1 in FIG. 20) in the direction in which the four electrode body elements are stacked (the up-down direction in FIG. 20). The second electrode body element 3d has a second positive-electrode tab group 40d and a second negative-electrode tab group 50d at positions nearer than a roll-center portion 3d1 to the outer surface thereof (below the roll-center portion 3d1 in FIG. 20) in the direction in which the four electrode body elements are stacked (the up-down direction in FIG. 20). The third electrode body element 3e has a third positive-electrode tab group 40e and a third negative-electrode tab group 50e at positions nearer than a roll-center portion 3e1 to the center thereof (below the roll-center portion 3e1 in FIG. 20) in the direction in which the four electrode body elements are stacked (the up-down direction in FIG. 20). The fourth electrode body element 3f has a fourth positive-electrode tab group 40f and a fourth negative-electrode tab group 50f at positions nearer than a roll-center portion 3f1 to the center thereof (above the roll-center portion 3f1 in FIG. 20) in the direction in which the four electrode body elements are stacked (the up-down direction in FIG. 20). The first positive-electrode tab group 40c and the third positive-electrode tab group 40e, the second positive-electrode tab group 40d and the fourth positive-electrode tab group 40f, the first negative-electrode tab group 50c and the third negative-electrode tab group 50e, and the second negative-electrode tab group 50d and the fourth negative-electrode tab group 50f are respectively disposed adjacent to each other so that these tab groups can be easily bundled.

In the rectangular secondary battery including the electrode body, the first electrode body element 3c and the third electrode body element 3e are superposed on each other, and the first positive-electrode tab group 40c and the third positive-electrode tab group 40e are bundled and connected to the positive-electrode current collector. The first negative-electrode tab group 50c and the third negative-electrode tab group 50e are bundled and connected to the negative-electrode current collector. The second electrode body element 3d and the fourth electrode body element 3f are superposed on each other, and the second positive-electrode tab group 40d and the fourth positive-electrode tab group 40f are bundled and connected to the positive-electrode current collector. The second negative-electrode tab group 50d and the fourth negative-electrode tab group 50f are bundled and connected to the negative-electrode current collector.

Subsequently, the first electrode body element 3c and the third electrode body element 3e, which have been superposed on each other, and the second electrode body element 3d and the fourth electrode body element 3f, which have been superposed on each other, are superposed on each other. At this time, the first positive-electrode tab group 40c and the third positive-electrode tab group 40e are bent in the same direction, and the first negative-electrode tab group 50c and the third negative-electrode tab group 50e are bent in the same direction. The second positive-electrode tab group 40d and the fourth positive-electrode tab group 40f are bent in the same direction, and the second negative-electrode tab group 50d and the fourth negative-electrode tab group 50f are bent in the same direction. This configuration allows a space occupied by the tab groups to be reduced while reducing a load applied to the tab groups and the joints between the tab groups and the current collectors, and therefore the rectangular secondary battery can easily have higher volumetric energy density.

Preferably, the first electrode body element 3c and the third electrode body element 3e, and, the second electrode body element 3d and the fourth electrode body element 3f are respectively connected to each other beforehand. For example, these elements may be bonded to each other via an adhesive layer, or may be fixed to each other by using a tape or the like.

Preferably, the electrode body illustrated in FIG. 20 is formed by using two sets of electrode body elements, each of the sets including the first electrode body element 3c and the third electrode body element 3e. That is, the first electrode body element 3c and the fourth electrode body element 3f may be the same electrode body element, and the second electrode body element 3d and the third electrode body element 3e may be the same electrode body element. With this structure, basically, it is only necessary to prepare two types of electrode body elements.

Rectangular Secondary Battery Including Short-Circuit Mechanism

Preferably, a rectangular secondary battery includes a pressure-sensitive short-circuit mechanism that operates when the pressure inside the battery case becomes a predetermined pressure or higher due to overcharging or the like. When the short-circuit mechanism operates, the positive electrode plate and the negative electrode plate are short-circuited at a position outside of the electrode body. This structure can prevent progress of overcharging. Preferably, a fuse portion, which is formed in the positive-electrode current collector or the like, is configured to blow due to a short-circuit current that flows when the short-circuit mechanism operates. The ruse portion can more reliably prevent progress of overcharging.

Figure 21A:
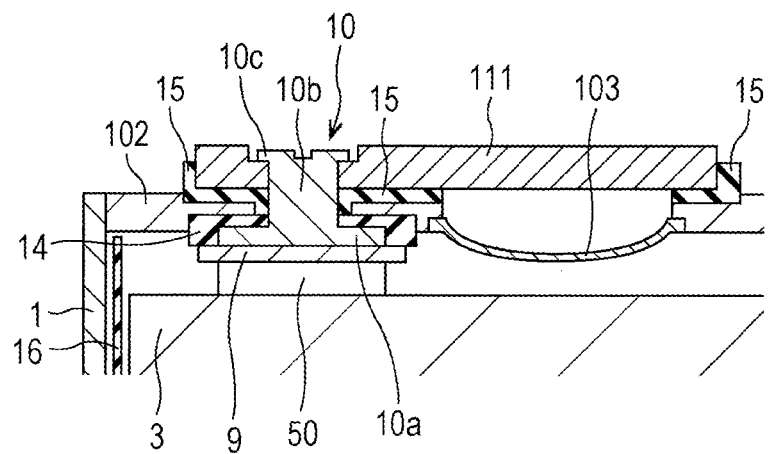
FIG. 21A illustrates the structure of a region near a negative electrode terminal of a rectangular secondary battery including a short-circuit mechanism.
Figure 21B:
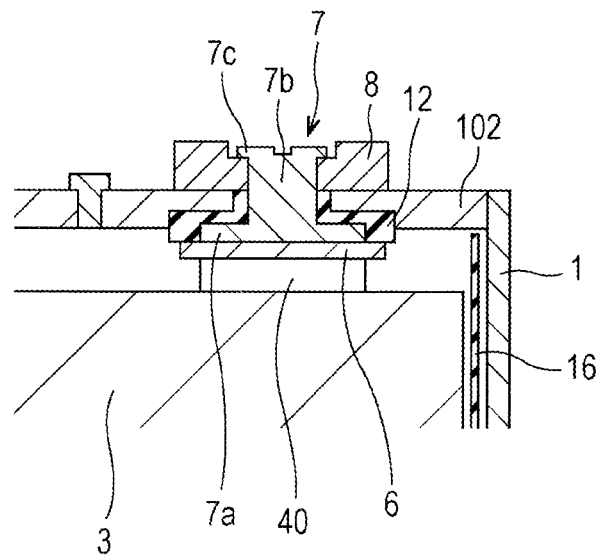
FIG. 21B illustrates the structure of a region near a positive electrode terminal of the rectangular secondary battery including the short-circuit mechanism.

FIG. 21A is a sectional view of a region near the negative electrode terminal 10 of a rectangular secondary battery including a short-circuit mechanism, taken in the longitudinal direction of a sealing plate 102. FIG. 21B is a sectional view of a region near the positive electrode terminal 7 of the rectangular secondary battery including the short-circuit mechanism, taken in the longitudinal direction of the sealing plate 102.

As illustrated in FIG. 21A, the sealing plate 102 has a deformable portion 103. The negative-electrode tab group 50 (a first negative-electrode tab group, a second negative-electrode tab group) is connected to a surface of the negative-electrode current collector 9 facing the electrode body 3. The negative-electrode current collector 9 is connected to a surface of the flange portion 10a of the negative electrode terminal 10 facing the electrode body 3. The insertion portion 10b of the negative electrode terminal 10 is inserted into a through-hole in the inner insulator 14, a through-hole in the sealing plate 102, a through-hole in the outer insulator 15, and a through-hole in a negative-electrode outer conductor 111. The upset portion 10c is formed by upsetting an end portion of the insertion portion 10b. The negative-electrode outer conductor 111 extends to a position where the negative-electrode outer conductor 111 faces the deformable portion 103 of the sealing plate 102.

As illustrated in FIG. 21B, the positive-electrode outer conductor 8 is disposed directly on the sealing plate 102. Accordingly, the positive electrode plate 4 is electrically connected to the sealing plate 102 via the positive-electrode tab group 40 (a first positive-electrode tab group, a second positive-electrode tab group), the positive-electrode current collector 6, the positive electrode terminal 7, and the positive-electrode outer conductor 8. A conductor may be disposed between the positive-electrode outer conductor 8 and the sealing plate 102. The positive-electrode current collector 6 may be welded to the sealing plate 102 without using the positive electrode terminal 7 and the inner insulator 12.

When the rectangular secondary battery is overcharged and the pressure inside the battery case becomes a predetermined pressure or higher, the deformable portion 103 of the sealing plate 102 becomes deformed so as to approach the negative-electrode outer conductor 111, and the deformable portion 103 and the negative-electrode outer conductor 111 are electrically connected to each other. Thus, the positive electrode plate 4 and the negative electrode plate 5 are electrically short-circuited via the sealing plate 102 and the deformable portion 103. Thus, flow of a charge current into the electrode body 3 is suppressed. When a fuse portion is formed in the positive-electrode current collector 6 or the like, the fuse portion blows due to a short-circuit current that flows when the short-circuit mechanism operates. Thus, it is possible to reliably prevent progress of overcharging. The short-circuit mechanism operates at a pressure lower than a pressure at which the gas discharge valve 19 operates.

Ninth Modification

Figure 22:
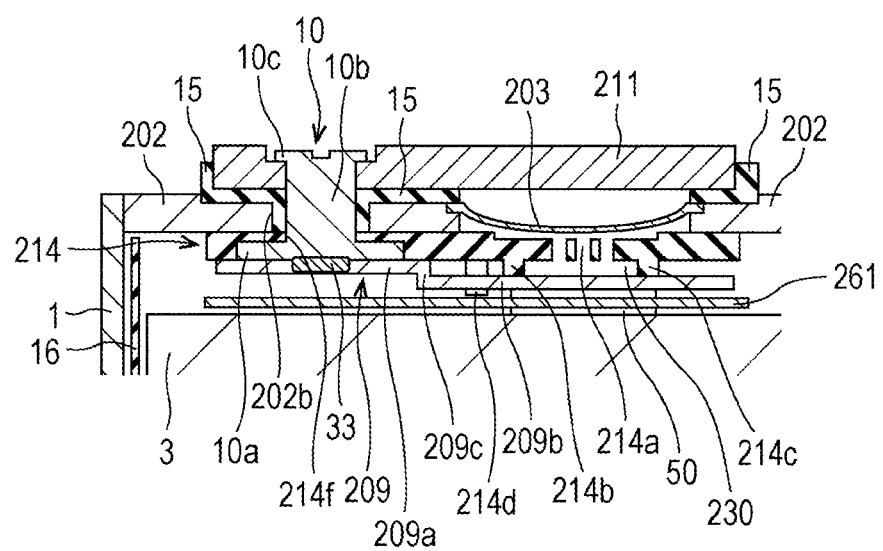
FIG. 22 is a sectional view of a region near a negative electrode terminal of a rectangular secondary battery according to a ninth modification, taken in the longitudinal direction of the sealing plate.

FIG. 22 is a sectional view of a region near a negative electrode terminal of a rectangular secondary battery according to a ninth modification, taken in the longitudinal direction of the sealing plate. The rectangular secondary battery according to the ninth modification includes a pressure-sensitive short-circuit mechanism. Although not illustrated, the positive electrode plate and the sealing plate are electrically connected to each other. The positive-electrode current collector has a fuse portion.

As illustrated in FIG. 22, a sealing plate 202 has a deformable portion 203. The sealing plate 202 and the deformable portion 203 are each made of a metal. The deformable portion 203 is connected to the sealing plate 202 so as to block a through-hole formed in the sealing plate 202. Preferably, the deformable portion 203 has a shape such that a central part thereof protrudes toward the electrode body 3. The negative-electrode tab group 50 of the electrode body 3 is connected to a surface of a negative-electrode current collector 209 facing the electrode body 3. The negative-electrode current collector 209 is connected to a surface of the flange portion 10a of the negative electrode terminal 10 facing the electrode body 3, and thereby a joint 33 is formed. The insertion portion 10b of the negative electrode terminal 10 is inserted into a through-hole 214f of an inner insulator 214, a negative-electrode-terminal attachment hole 202b in the sealing plate 202, a through-hole in the outer insulator 15, and a through-hole in a negative-electrode outer conductor 211. An end portion of the insertion portion 10b is upset on the negative-electrode outer conductor 211. The upset portion 10c is formed at the end portion of the insertion portion 10b. The negative-electrode outer conductor 211, which is electrically connected to the negative electrode terminal 10, extends to a position where the negative-electrode outer conductor 211 faces the deformable portion 203.

The inner insulator 214, which is made of a resin, is disposed between the negative-electrode current collector 209 and the negative electrode terminal 10 and the sealing plate 202. The outer insulator 15, which is made of a resin, is disposed between the negative-electrode outer conductor 211 and the sealing plate 202. The insulating sheet 16 is disposed between the rectangular casing 1 and the electrode body 3.

When the rectangular secondary battery is overcharged and the pressure inside the battery case becomes a predetermined pressure or higher due to a generated gas, the central part of the deformable portion 203 becomes deformed so as to approach the negative-electrode outer conductor 211 and contacts the negative-electrode outer conductor 211. Thus, the positive electrode terminal and the negative electrode terminal 10 are electrically connected to each other via the sealing plate 202, the deformable portion 203, and the negative-electrode outer conductor 211. Thus, flow of a charge current into the electrode body 3 is suppressed, and progress of overcharging is prevented. When a fuse portion is formed in the positive-electrode current collector, the fuse portion blows due to a short-circuit current that flows when the short-circuit mechanism operates, and it is possible to more reliably prevent progress of overcharging.

The negative-electrode current collector 209 includes a terminal connection portion 209a and a tab connection portion 209b. The negative electrode terminal 10 is connected to the terminal connection portion 209a. The negative-electrode tab group 50 is connected to the tab connection portion 209b. Preferably, in the direction perpendicular to the sealing plate 202, the distance from the sealing plate 2 to the tab connection portion 209b is greater than the distance from the sealing plate 2 to the terminal connection portion 209a. This structure allows a gap 230 to be reliably formed between the inner insulator 214 and the tab connection portion 209b of the negative-electrode current collector 209. Thus, a gas generated in the electrode body 3 can more smoothly reach a lower part of the deformable portion 203. In order to form such a structure, preferably, the negative-electrode current collector 209 has a stepped portion 209c between the terminal connection portion 209a and the tab connection portion 209b. Preferably, cutouts 209d are formed in both end portions of the negative-electrode current collector 209 in the width direction near the stepped portion 209c.

The inner insulator 214 has an insulator through-hole 214a in a portion thereof disposed between the deformable portion 203 and the electrode body 3. The insulator through-hole 214a allows a gas, generated in the electrode body 3, to more smoothly reach a lower part of the deformable portion 203. Preferably, a plurality of insulator through-holes 214a are formed.

The inner insulator 214 has an insulator protrusion 214b and an insulator protrusion 214c on a surface thereof facing the electrode body 3. The insulator protrusion 214b and the insulator protrusion 214c allow the gap 230 to be more reliably formed between the inner insulator 214 and the negative-electrode current collector 209. Thus, a gas generated in the electrode body 3 can more smoothly reach a lower part of the deformable portion 203. Note that the insulator protrusion 214b and the insulator protrusion 214c need not be formed. Only one of the insulator protrusion 214b and the insulator protrusion 214c may be formed. The height of the gap 230 (the length of the gap 230 in the direction perpendicular to the sealing plate 202) is preferably 0.5 mm or greater, and more preferably, 1 mm or greater.

Preferably, the inner insulator 214 includes engagement portions 214d that engage with the negative-electrode current collector 209. This structure allows a load applied to the joint 33 or the like to be suppressed, even if an impact or vibration is applied to the rectangular secondary battery. Preferably, the engagement portions 214d have shapes such that the engagement portions 214d contact a side surface of the negative-electrode current collector 209 and a surface of the negative-electrode current collector 209 facing the electrode body 3.

FIGS. 23A to 23D illustrate a process of assembling components near the negative electrode terminal of the rectangular secondary battery according to the ninth modification.

Figure 23A:
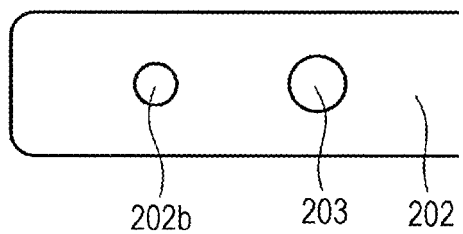
FIGS. 23A to 23D illustrate a method of assembling components near the negative electrode terminal of the rectangular secondary battery according to the ninth modification.

FIG. 23A illustrates a surface of the sealing plate 202 facing the electrode body 3. The sealing plate 202 has the negative-electrode-terminal attachment hole 202b and the deformable portion 203.

Figure 23B:
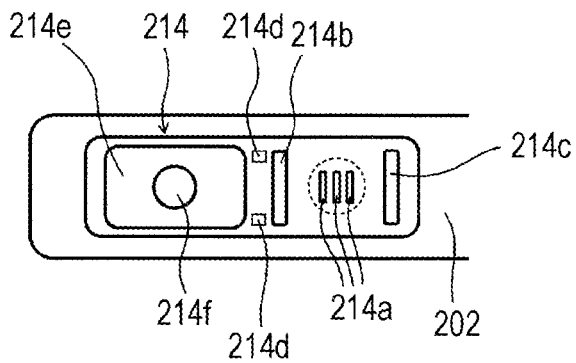

As illustrated in FIG. 23B, the inner insulator 214 is placed on the surface of the sealing plate 202 facing the electrode body 3. The inner insulator 214 has an insulator recess 214e, in which the flange portion 10a of the negative electrode terminal 10 is to be placed. The through-hole 214f is formed at the center of the insulator recess 214e. The through-hole 214f and the negative-electrode-terminal attachment hole 202b of the sealing plate 202 are made to overlap each other. Although not illustrated, the outer insulator 15 and the negative-electrode outer conductor 211 are placed on a surface of the sealing plate 202 facing the outside of the battery.

Figure 23C:
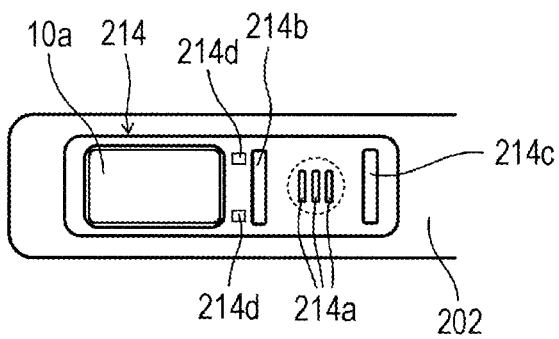

As illustrated in FIG. 23C, from the electrode body 3 side, the insertion portion 10b of the negative electrode terminal 10 is inserted into the through-hole 214f in the inner insulator 214, the negative-electrode-terminal attachment hole 202b in the sealing plate 202, the through-hole in the outer insulator 15, and the through-hole in the negative-electrode outer conductor 211. Then, the upset portion 10c is formed by upsetting an end portion of the insertion portion 10b. Thus, the negative electrode terminal 10, the negative-electrode outer conductor 211, the outer insulator 15, and the inner insulator 214 are fixed to the sealing plate 202.

Figure 23D:
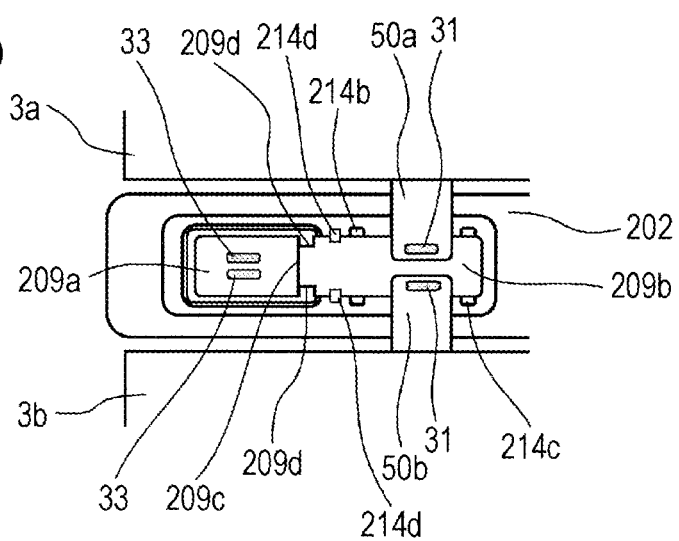

As illustrated in FIG. 23D, the negative-electrode current collector 209, to which the first negative-electrode tab group 50a of the first electrode body element 3a and the second negative-electrode tab group 50b of the second electrode body element 3b have been connected, is connected to the flange portion 10a of the negative electrode terminal 10. At this time, in the transversal direction of the sealing plate 202, the first electrode body element 3a is placed on one side of the sealing plate 202, and the second electrode body element 3b is placed on the other side of the sealing plate 202. Preferably, the tab connection portion 209b of the negative-electrode current collector 209 is placed on the insulator protrusion 214b and the insulator protrusion 214c. Preferably, the negative-electrode current collector 209 is engaged with the inner insulator 214 by using the engagement portions 214d. The insulator protrusion 214b or the insulator protrusion 214c may have an engagement portion that engages with the negative-electrode current collector 209.

Figure 24:
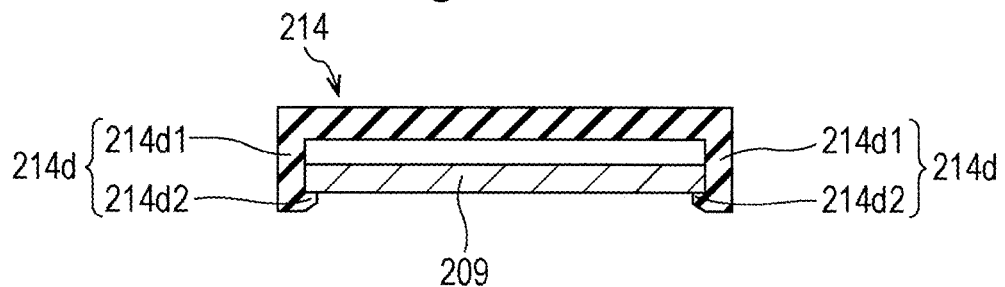
FIG. 24 is a sectional view of a region of a region near engagement portions between an inner insulator and the negative-electrode current collector of the rectangular secondary battery according to the ninth modification, taken in the transversal direction of the sealing plate.

FIG. 24 is a sectional view of a region near the engagement portions 214d of the inner insulator 214, taken in the transversal direction of the sealing plate 202. The engagement portions 214d of the inner insulator 214 include side walls 214d1, which extend from a body thereof toward the electrode body 3, and hooks 214d2 formed at ends thereof. The negative-electrode current collector 209 is held by being engaged with the hooks 214d2.

After assembly has progressed to the state shown in FIG. 23D, the first electrode body element 3a and the second electrode body element 3b are combined together. At this time, the first negative-electrode tab group 50a and the second negative-electrode tab group 50b are bent in different directions. Also on the positive electrode side, preferably, the positive-electrode current collector, to which the first positive-electrode tab group and the second positive-electrode tab group have been connected, is connected to the positive electrode terminal, and the first positive-electrode tab group and the second positive-electrode tab group are bent in different directions.

The first electrode body element 3a and the second electrode body element 3b each may be a stacked element or may be a rolled element. The electrode body 3 may include three or more electrode body elements. It is not necessary that the negative-electrode outer conductor 211 and the deformable portion 203 directly contact each other when the deformable portion 203 becomes deformed. The sealing plate 202 and the negative electrode terminal 10 may be electrically connected to each other when the deformable portion 203 becomes deformed. For example, the negative-electrode outer conductor 211 and the deformable portion 203 may be electrically connected to each other via another conductor. A conductor different from the negative-electrode outer conductor 211 may be electrically connected to the negative electrode terminal 10 and may be disposed at a position where the conductor faces the deformable portion 203.

Preferably, a resin cover 261 is disposed between the negative-electrode current collector 209 and the electrode body 3. The cover 261 can prevent damage to the joint 31, the joint 33, or components near the short-circuit mechanism, even when the electrode body 3 moves toward the sealing plate 202. Preferably, the cover 261 is connected to the inner insulator 214. Preferably, fitting is used as a connection method. For example, the cover 261 may have an arm that extends toward the inner insulator 214, and the cover 261 may be connected to the inner insulator 214 by using the arm. Preferably, the cover 261 is disposed between the joint 33 and the electrode body 3. Preferably, the cover 261 is disposed between the deformable portion 203 and the electrode body 3. Preferably, the cover 261 is placed at a predetermined position after connecting the negative-electrode current collector 209 to the negative electrode terminal 10 and before combining the first electrode body element 3a and the second electrode body element 3b together. Preferably, the cover 261 has a cutout at an end thereof in the transversal direction of the sealing plate 202, and the negative-electrode tab group 50 extends through the cutout.

Tenth Modification

Figure 25:
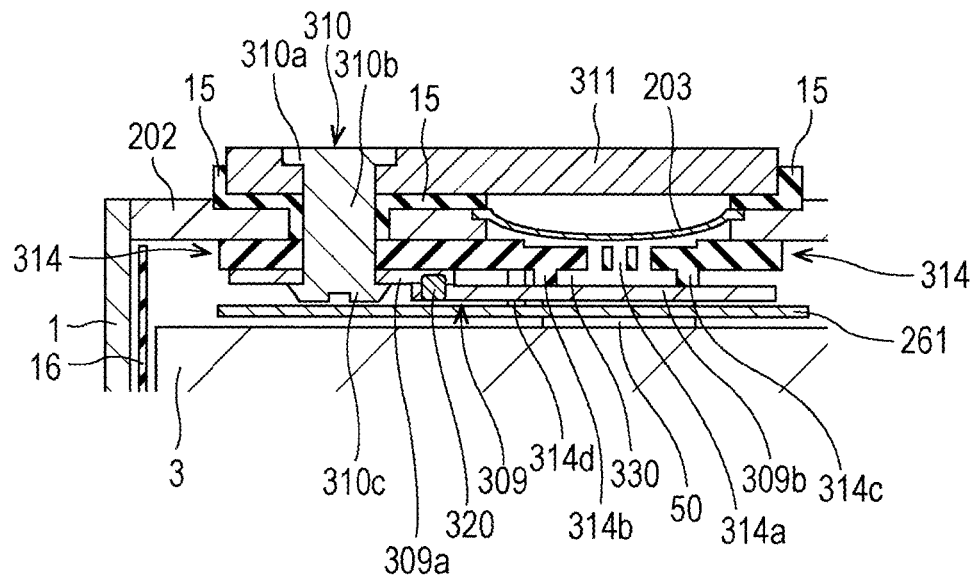
FIG. 25 is a sectional view of a region near a negative electrode terminal of a rectangular secondary battery according to a tenth modification, taken in the longitudinal direction of the sealing plate.

FIG. 25 is a sectional view of a region near a negative electrode terminal of a rectangular secondary battery according to a tenth modification, taken in the longitudinal direction of the sealing plate. The rectangular secondary battery according to the tenth modification basically has the same structure as the rectangular secondary battery according to the ninth modification. However, the rectangular secondary battery according to the tenth modification differs from the rectangular secondary battery according to the ninth modification in the structures of the negative electrode terminal and the negative-electrode current collector.

As illustrated in FIG. 25, the sealing plate 202 has a deformable portion 203. A negative electrode terminal 310 has a flange portion 310a at a position further outward from the sealing plate 202 with respect to the battery. An insertion portion 310b of the negative electrode terminal 310 is inserted, from the outside of the battery, into a through-hole in a negative-electrode outer conductor 311, a through-hole in the outer insulator 15, a through-hole in the sealing plate 202, a through-hole in an inner insulator 314, and a through-hole in a terminal connection portion 309a of a negative-electrode current collector 309. An end portion of the insertion portion 310b is upset. An upset portion 310c is formed at the end portion of the insertion portion 310b. Preferably, the upset portion 310c is welded to the terminal connection portion 309a.

The negative-electrode tab group 50, which is connected to the electrode body 3, is connected to a surface of a tab connection portion 309b of the negative-electrode current collector 309 facing the electrode body 3. The tab connection portion 309b of the negative-electrode current collector 309 is welded to the terminal connection portion 309a of the negative-electrode current collector 309, and thereby a joint 320 is formed. Accordingly, the negative electrode plate is electrically connected to the negative-electrode outer conductor 311 via the negative-electrode tab group 50, the negative-electrode current collector 309, and the negative electrode terminal 310.

The inner insulator 314, which is made of a resin, is disposed between the negative-electrode current collector 309 and the sealing plate 202. The inner insulator 314 has insulator through-holes 314a in a part thereof disposed between the deformable portion 203 and the electrode body 3. The inner insulator 314 has an insulator protrusion 314b and an insulator protrusion 314c. The tab connection portion 309b of the negative-electrode current collector 309 is disposed so as to be in contact with the insulator protrusion 314b and the insulator protrusion 314c. Thus, a gap 330 is formed between the inner insulator 314 and the tab connection portion 309b of the negative-electrode current collector 309. The inner insulator 314 has an engagement portion 314d that engages with the negative-electrode current collector 309. As in the ninth modification, preferably, a resin cover 261 is disposed between the negative-electrode current collector 309 and the electrode body 3. Preferably, the cover 261 is connected to the inner insulator 314.

Shielding Member

A shielding member, which is made of a metal, may be disposed between the gas discharge valve of the sealing plate and the electrode body. This structure can suppress ejection of molten substances, sparks, and the like from the gas discharge valve when the gas discharge valve is cleaved and opened.

Figure 26:
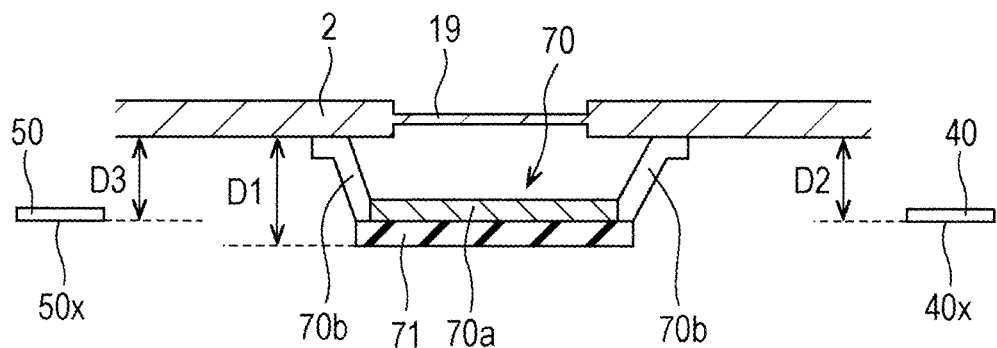
FIG. 26 is a sectional view of a region near a shielding member, taken in the longitudinal direction of the sealing plate.

As illustrated in FIG. 26, a shielding member 70 includes a shielding portion 70a, which faces the gas discharge valve 19 and is separated from a surface of the sealing plate 2 facing the inside of the battery, and a plurality of legs 70b, which extend from the shielding portion 70a toward the sealing plate 2 and are connected to the sealing plate 2. A gas generated in the electrode body passes through a space between the legs 70b and reaches the gas discharge valve 19. Preferably, an insulating resin member 71 is disposed between the shielding portion 70a of the shielding member 70 and the electrode body. The resin member 71 may be an insulating tape, a resin sheet, a resin plate, or the like that is affixed to the shielding portion 70a. The resin member 71 may be fixed to the shielding member 70 by being fitted to or engaged with the shielding member 70. The resin member 71 may be connected to an inner insulator that is disposed between the sealing plate 2 and the positive-electrode current collector or the negative-electrode current collector. The shielding member 70 may be molded with a resin, and a resin layer formed on the shielding member 70 may be used as the resin member 71.

A first surface 40x is a surface of a part of the positive-electrode tab group 40 disposed on the positive-electrode current collector, the surface being located nearest to the electrode body. A second surface 50x is a surface of a part of the negative-electrode tab group 50 disposed on the negative-electrode current collector, the surface being located nearest to the electrode body. As illustrated in FIG. 26, a distance D1 is defined as the distance between a surface of the sealing plate 2 facing the electrode body and a surface of the resin member 71 facing the electrode body in the direction perpendicular to the sealing plate 2. A distance D2 is defined as the distance between the surface of the sealing plate 2 facing the electrode body and the first surface 40x in the direction perpendicular to the sealing plate 2. A distance D3 is defined as the distance between the surface of the sealing plate 2 facing the electrode body and the second surface 50x in the direction perpendicular to the sealing plate 2. Preferably, D1 is greater than D2, and D1 is greater than D3. This structure can reliably prevent the electrode body from contacting the joint between the positive-electrode tab group 40 and the positive-electrode current collector or the joint between the negative-electrode tab group 50 and the negative-electrode current collector, even if the electrode body moves toward the sealing plate 2 due to an impact or vibration.

Pressure-Sensitive Electric-Current Blocking Mechanism

Instead of the pressure-sensitive short-circuit mechanism described above, a pressure-sensitive electric-current blocking mechanism may be used. Preferably, the electric-current blocking mechanism is disposed in a conduction path between the positive electrode plate and the positive electrode terminal. The electric-current blocking mechanism operates when the pressure inside the battery case becomes a predetermined pressure or higher and blocks the conduction path between the positive electrode plate and the positive electrode terminal. For example, the electric-current blocking mechanism may be disposed between the positive-electrode current collector and the positive electrode terminal.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A rectangular secondary battery comprising:
   a rectangular casing that has an opening;
   a sealing plate that seals the opening;
   an electrode body that is disposed in the rectangular casing and that includes a positive electrode plate and a negative electrode plate;
   a tab that is connected to the positive electrode plate or the negative electrode plate;
   a current collector that is connected to the tab; and
   a terminal that is electrically connected to the current collector and that extends through the sealing plate,
   wherein the electrode body includes a first tab group that is composed of a plurality of the tabs and a second tab group that is composed of a plurality of the tabs,
   wherein the first tab group and the second tab group are disposed between the electrode body and the sealing plate,
   wherein the first tab group and the second tab group are disposed so as to be bent in different directions, and
   wherein the first tab group and the second tab group are each connected to a surface of the current collector facing the electrode body.

2. The rectangular secondary battery according to claim 1, further comprising:
   an outer conductor that is disposed further outward from the sealing plate with respect to the battery,
   wherein the terminal includes a flange portion at a position nearer than the sealing plate to the electrode body,
   wherein the terminal is upset on the outer conductor at a position further outward from the sealing plate with respect to the battery, and
   wherein the current collector is connected to a surface of the flange portion facing the electrode body.

3. The rectangular secondary battery according to claim 1, further comprising:
   a short-circuit mechanism that operates when a pressure inside a battery case, which is composed of the rectangular casing and the sealing plate, becomes a predetermined pressure or higher, and that short-circuits the positive electrode plate and the negative electrode plate at a position outside of the electrode body.

4. The rectangular secondary battery according to claim 1, wherein the electrode body includes a first electrode body element and a second electrode body element,
   wherein the first tab group is connected to the first electrode body element, and
   wherein the second tab group is connected to the second electrode body element.

5. The rectangular secondary battery according to claim 4, wherein the first electrode body element and the second electrode body element are each a rolled electrode body element, and
   wherein the first electrode body element and the second electrode body element are each disposed in the rectangular casing in an orientation such that a roll axis thereof is perpendicular to the sealing plate.

6. The rectangular secondary battery according to claim 5, wherein the tab is a negative electrode tab that is connected to the negative electrode plate, and
   wherein, in the first electrode body element, the number of the negative electrode tabs is less than the number of layers of the negative electrode plate that are stacked.

7. The rectangular secondary battery according to claim 4, wherein the electrode body further includes a third electrode body element that is a rolled electrode body element including a third tab group and a fourth electrode body element that is a rolled electrode body element including a fourth tab group,
   wherein the third tab group is superposed on the first tab group and connected to the current collector, and
   wherein the fourth tab group is superposed on the second tab group and connected to the current collector.

8. The rectangular secondary battery according to claim 1, wherein the current collector is a positive-electrode current collector that is connected to the positive electrode plate and that is made of aluminum or an aluminum alloy, and
   wherein a fuse portion is formed in the positive-electrode current collector.

9. A method of manufacturing a rectangular secondary battery,
   the rectangular secondary battery including
   a rectangular casing that has an opening,
   a sealing plate that seals the opening,
   an electrode body that is disposed in the rectangular casing and that includes a positive electrode plate and a negative electrode plate,
   a tab that is connected to the positive electrode plate or the negative electrode plate,
   a current collector that is connected to the tab, and
   a terminal that is electrically connected to the current collector and that extends through the sealing plate,
   wherein the electrode body includes a first tab group that is composed of a plurality of the tabs and a second tab group that is composed of a plurality of the tabs,
   wherein the first tab group and the second tab group are disposed between the electrode body and the sealing plate,
   wherein the first tab group and the second tab group are disposed so as to be bent in different directions,
   wherein the first tab group and the second tab group are each connected to a surface of the current collector facing the electrode body, and
   wherein the electrode body includes a first electrode body element and a second electrode body element,
   the method comprising:
   a first connection step of connecting, to one surface of the current collector, the first tab group that is connected to the first electrode body element and the second tab group that is connected to the second electrode body element; and an electrode-body producing step of combining the first electrode body element and the second electrode body element together in such a way that the first tab group and the second tab group are bent in different directions.

10. The method according to claim 9,
wherein the rectangular secondary battery further includes an outer conductor that is disposed further outward from the sealing plate with respect to the battery, and
wherein the terminal includes a flange portion at a position nearer than the sealing plate to the electrode body, the method further comprising:
an upsetting step of upsetting an end portion of the terminal on the outer conductor; and
a second connection step of connecting, after the upsetting step and the first connection step, the current collector to a surface of the flange portion facing the electrode body.

11. The method according to claim 9,
wherein the rectangular secondary battery further includes a short-circuit mechanism that operates when a pressure inside a battery case, which is composed of the rectangular casing and the sealing plate, becomes a predetermined pressure or higher, and that short-circuits the positive electrode plate and the negative electrode plate at a position outside of the electrode body.

12. The method according to claim 9, further comprising:
a step of producing the first electrode body element by rolling up the positive electrode plate having a strip-like shape and the negative electrode plate having a strip-like shape with a separator having a strip-like shape therebetween; and
a step of producing the second electrode body element by rolling up the positive electrode plate having a strip-like shape and the negative electrode plate having a strip-like shape with a separator having a strip-like shape therebetween.

13. The method according to claim 12,
wherein the tab is a negative electrode tab that is connected to the negative electrode plate, and
wherein, in the step of producing the first electrode body element, the first electrode body element is produced, by using the negative electrode plate provided with a plurality of the negative electrode tabs, in such a way that the number of the negative electrode tabs is less than the number of layers of the negative electrode plate that are stacked.

14. The method according to claim 12,
wherein the electrode body further includes a third electrode body element that is a rolled electrode body element including a third tab group and a fourth electrode body element that is a rolled electrode body element including a fourth tab group, and
wherein, in the first connection step, the first tab group and the third tab group are superposed on each other and connected to the current collector in a state in which the first electrode body element and the third electrode body element are superposed on each other, and the second tab group and the fourth tab group are superposed on each other and connected to the current collector in a state in which the second electrode body element and the fourth electrode body element are superposed on each other.

15. The method according to claim 9,
wherein the current collector is a positive-electrode current collector that is connected to the positive electrode plate and that is made of aluminum or an aluminum alloy, and
wherein a fuse portion is formed in the positive-electrode current collector.

* * * * *